(12) United States Patent
Mullaney et al.

(10) Patent No.: US 7,799,995 B2
(45) Date of Patent: Sep. 21, 2010

(54) SEALING ASSEMBLIES FOR ELONGATE MEMBERS AND METHODS FOR USING THE SAME

(75) Inventors: Julian Mullaney, Raleigh, NC (US); Justin Everette Thompson, Angier, NC (US); William Alan Carrico, Raleigh, NC (US)

(73) Assignee: Tyco Electronics Corporation, Middletown, PA (US)

( * ) Notice: Subject to any disclaimer, the term of this patent is extended or adjusted under 35 U.S.C. 154(b) by 130 days.

(21) Appl. No.: 12/198,278

(22) Filed: Aug. 26, 2008

(65) Prior Publication Data

US 2009/0058018 A1 Mar. 5, 2009

Related U.S. Application Data

(60) Provisional application No. 60/966,314, filed on Aug. 27, 2007.

(51) Int. Cl.
*H02G 15/08* (2006.01)
(52) U.S. Cl. ............... 174/77 R; 174/92
(58) Field of Classification Search ............ 174/77 R, 174/92, 93
See application file for complete search history.

(56) References Cited

U.S. PATENT DOCUMENTS

| | | | | |
|---|---|---|---|---|
| 4,849,580 | A * | 7/1989 | Reuter | 174/92 |
| 4,909,756 | A | 3/1990 | Jervis | |
| 5,210,374 | A | 5/1993 | Channell | |
| 6,046,406 | A | 4/2000 | Milanowski et al. | |
| 6,071,148 | A | 6/2000 | Radliff et al. | |
| 6,875,926 | B2 | 4/2005 | Buekers et al. | |
| 2004/0080119 | A1 | 4/2004 | Goll | |
| 2006/0261560 | A1 | 11/2006 | Radliff et al. | |
| 2007/0189694 | A1 | 8/2007 | Mullaney et al. | |
| 2008/0169116 | A1 | 7/2008 | Mullaney et al. | |
| 2008/0224419 | A1 | 9/2008 | Mullaney et al. | |

FOREIGN PATENT DOCUMENTS

| | | |
|---|---|---|
| DE | 10020493 A1 | 11/2001 |
| JP | 03139113 | 6/1991 |
| WO | WO 92/22116 | 12/1992 |

(Continued)

OTHER PUBLICATIONS

International Search Report and Written Opinion (16 pages) corresponding to International Application No. PCT/US2008/010104; Mailing Date: Jan. 21, 2009.

(Continued)

*Primary Examiner*—Chau N Nguyen
(74) *Attorney, Agent, or Firm*—Myers Bigel Sibley & Sajovec, PA

(57) ABSTRACT

A sealing assembly for providing an environmental seal about an elongate member includes a housing defining a passage to receive an elongate member, a flowable sealant disposed in the passage, a compression mechanism and a trigger mechanism. The compression mechanism includes a biasing member. The biasing member is configured to apply a compression load against the sealant and the compression mechanism is configured to force the sealant to flow about the elongate member to provide an environmental seal about the elongate member. The trigger mechanism is configured to selectively actuate the biasing member to apply the compression load to the sealant.

24 Claims, 18 Drawing Sheets

FOREIGN PATENT DOCUMENTS

WO    WO 96/19024 A    6/1996

OTHER PUBLICATIONS

Bracket Mounted Terminal-BMT, Approved by SBC: Engineering/Ordering Guide (Jul. 2004), 7 pages.

Channell, Bracket Mouonted Terminal (BMT) Series, Telecom Closure Products, 2 pages.

Coyote® Dome Closure—The Evolution of a Breed Continues . . . Brochure, Preformed Line Products © 2004, 4 pages.

Coyote® Dome Closure End Plate Grommet, (May 2004), Preformed Line Products © 2004, 2 pages.

Fiber Optic Simplex Plug: Sealing Plugs for Small Diameter Ducts, Tyco Electronics Corporation © 2001, 2 pages.

FOSC 400: Fiber Optic Splice Closures,© Tyco Electronics Corporation, 4 pages.

FOSC 400 A8: Fiber Optic Splice/Tap/Drop Closure, Tyco Electronics Corporation © 2003, 2 pages.

Minitube Sealing System: Sealing Devices for Minitubes Installations in Duct Networks, Tyco Electronics Corporation © 2004, 2 pages.

FOSC 450: Fiber Optic Gel Splice Closures, Tyco Electronics Corporation © 2001, 2 pages.

FOSC 450: Fiber Optic Splice Closure Ordering Guide, Tyco Electronics Corporation © 2004, 26 pages.

FOSC 450 D Closure Installation Instruction: Fiber Optic Splice Closure, Tyco Electronics Corporation © 2003, 26 pages.

FOSC-500-AA Installation Instruction: Cold Applied Inline Splice Closure for Small Fiber Optic Cables (maximum 48 splices), Tyco Electronics Corporation © 2007, 12 pages.

\* cited by examiner

SEALING ASSEMBLIES FOR ELONGATE MEMBERS AND METHODS FOR USING THE SAME

RELATED APPLICATION(S)

The present application claims the benefit of U.S. Provisional Patent Application No. 60/966,314, filed Aug. 27, 2007, the disclosure of which is hereby incorporated herein by reference in its entirety.

FIELD OF THE INVENTION

The present invention relates to sealing devices and methods and, more particularly, to sealing devices and methods for effecting a seal about an elongate member.

BACKGROUND OF THE INVENTION

In various applications, a seal is provided about an elongate member at its entry into an enclosure or the like. For example, it is often necessary or desirable to enclose cable terminations or splices in environmentally sealed enclosures. For example, an operator may wish to enclose an optical fiber cable splice or termination in a splice enclosure.

SUMMARY OF THE INVENTION

According to some embodiments of the present invention, a sealing assembly for providing an environmental seal about an elongate member includes a housing defining a passage to receive an elongate member, a flowable sealant disposed in the passage, a compression mechanism and a trigger mechanism. The compression mechanism includes a biasing member. The biasing member is configured to apply a compression load against the sealant. The compression mechanism is configured to force the sealant to flow about the elongate member to provide an environmental seal about the elongate member. The trigger mechanism is configured to selectively actuate the biasing member to apply the compression load to the sealant.

In some embodiments, the housing includes first and second housing parts that are relatively movable between an open position and a closed position, and the trigger mechanism is configured to retain the compression mechanism in a cocked position and to release the compression mechanism into an actuated position responsive to closing of the housing. The biasing member applies the compression load to the sealant when the compression mechanism is in the actuated position.

According to some embodiments, the biasing member is configured to maintain the compression load against the sealant after the housing is closed to maintain a positively pressurized environmental seal about the elongate member. The biasing member may be configured to maintain the compression load against the sealant at a pressure of at least about 10 KPa.

In some embodiments, the biasing member includes a spring. The compression mechanism may include a pressure plate that is displaceable by the spring to apply the compression load against the sealant.

According to some embodiments, the elongate member has a lengthwise axis and the biasing member is configured to apply the compression load against the sealant in a loading direction transverse to the elongate member lengthwise axis.

The sealant may include a gel that is elastically displaced by the compression load.

In some embodiments, the sealing assembly is a cable enclosure assembly and the housing includes first and second housing parts relatively movable between an open position and a closed position. The first and second housing parts define an enclosed chamber when the housing is in its closed position.

According to some embodiments, the housing includes first and second housing parts relatively movable between an open position and a closed position. The sealant includes a first sealant disposed in the first housing part and a second sealant disposed in the second housing part. The first and second sealants are configured to collectively surround the elongate member in the passage when the housing is closed. The biasing member is configured to load the first sealant against the second sealant to provide the environmental seal circumferentially about the elongate member. The housing may include at least one first containment wall defining a first containment cavity in the first housing part, and at least one second containment wall defining a second containment cavity in the second housing part. The first sealant is disposed in the first containment cavity. The second sealant is disposed in the second containment cavity. The first and second sealants are bounded by the first and second containment walls to limit displacement of the first and second sealants when the first sealant is loaded against the second sealant by the biasing member.

According to some embodiments, the elongate member has an elongate member lengthwise axis and the sealing assembly includes at least one grommet configured to circumferentially wrap about the elongate member to limit axial displacement of the sealant when the compression load is applied to the sealant by the biasing member. In some embodiments, the housing includes first and second housing parts relatively movable between an open position and a closed position, and the sealing assembly includes first and second grommets mounted on the first and second housing parts, respectively, and configured to circumferentially wrap about the elongate member and overlap one another to limit axial displacement of the sealant when the compression load is applied to the sealant by the biasing member.

According to some method embodiments of the present invention, a method for forming an environmental seal about an elongate member using a sealing assembly including a housing defining a passage, a flowable sealant disposed in the passage, and a compression mechanism, includes: installing the elongate member in the passage; and thereafter actuating a trigger mechanism to selectively actuate a biasing member of the compression mechanism to apply a compression load to the sealant and to force the sealant to flow about the elongate member to provide an environmental seal about the elongate member using the compression mechanism.

Actuating the trigger mechanism may include relatively moving first and second housing parts of the housing from an open position to a closed position, responsive to which the trigger mechanism releases the compression mechanism from a cocked position to an actuated position. The biasing member applies the compression load to the sealant when the compression mechanism is in the actuated position.

According to some embodiments, actuating the trigger mechanism is followed by maintaining the compression load against the sealant using the biasing member to maintain a positively pressurized environmental seal about the elongate member. The compression load may be maintained against the sealant at a pressure of at least about 10 KPa using the biasing member.

The method may include applying the compression load against the sealant in a loading direction transverse to an elongate member lengthwise axis of the elongate member using the biasing member of the compression mechanism.

According to some embodiments, the sealant includes an elastically deformable gel, and the method includes elastically elongating and deforming the gel using the compression load such that the gel deforms to substantially conform to a portion of the elongate member and a restoring force in the elastically deformed gel bears against the portion of the elongate member.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
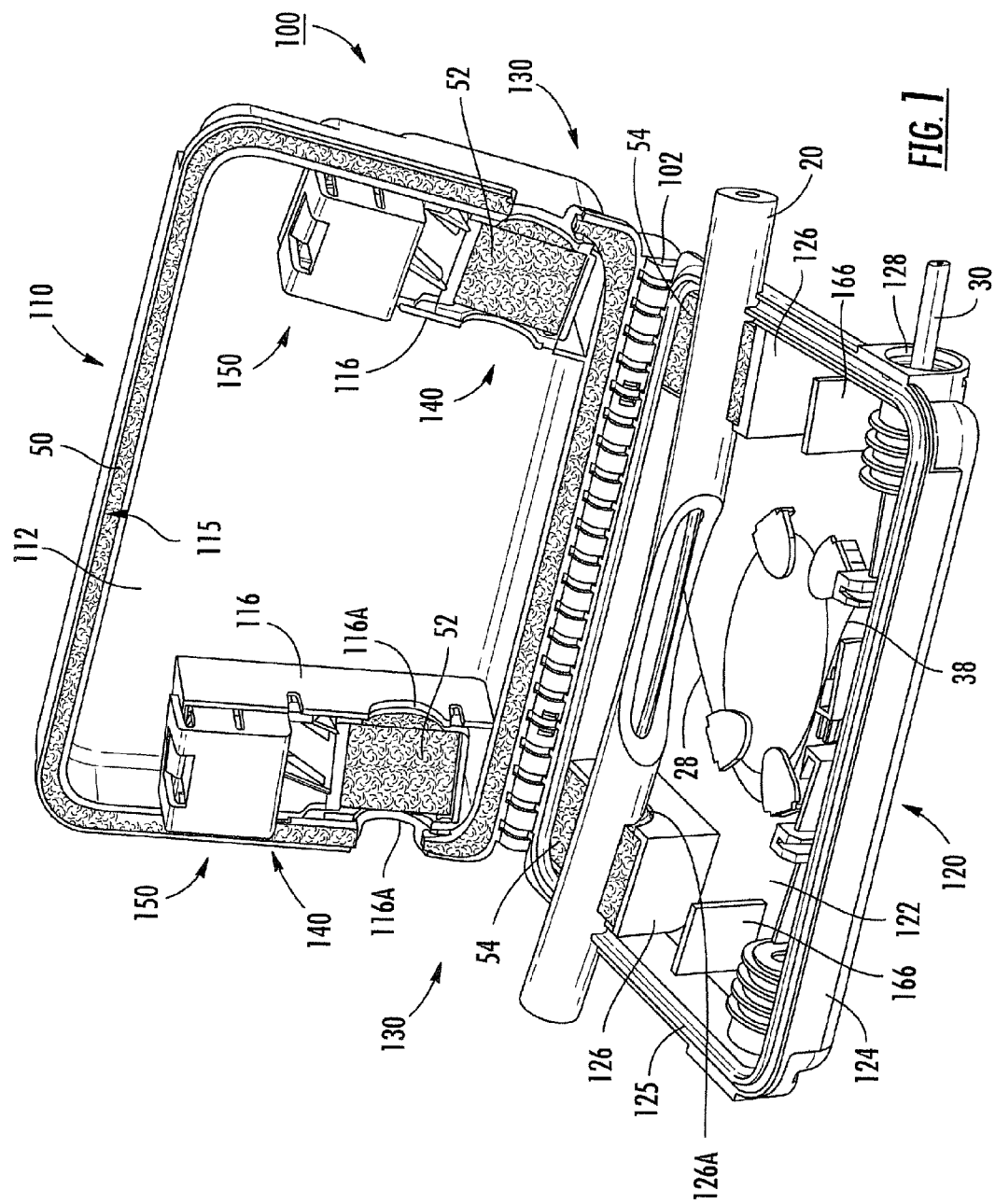
FIG. 1 is a perspective view of a cable enclosure assembly according to embodiments of the present invention in an open position.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present invention provide cable enclosure assemblies for environmentally protecting cable terminations or splices. More particularly, according to some embodiments, a cable enclosure assembly includes a cable sealant and a mechanism to displace the cable sealant about a circumference of the cable to provide improved or complete coverage of the sealant about the cable.

With reference to FIGS. 1-8, an elongate member sealing or enclosure assembly 100 according to embodiments of the present invention is shown therein. The assembly 100 can be used to provide an environmental seal about an elongate member or members such as a cable 20. The assembly 100 and use and operation thereof will be described herein with reference to cables (e.g., fiber optic cables); however, according to other embodiments, sealing assemblies of the present invention may be used to form a seal about other types of elongate members entering an enclosure.

Figure 2:
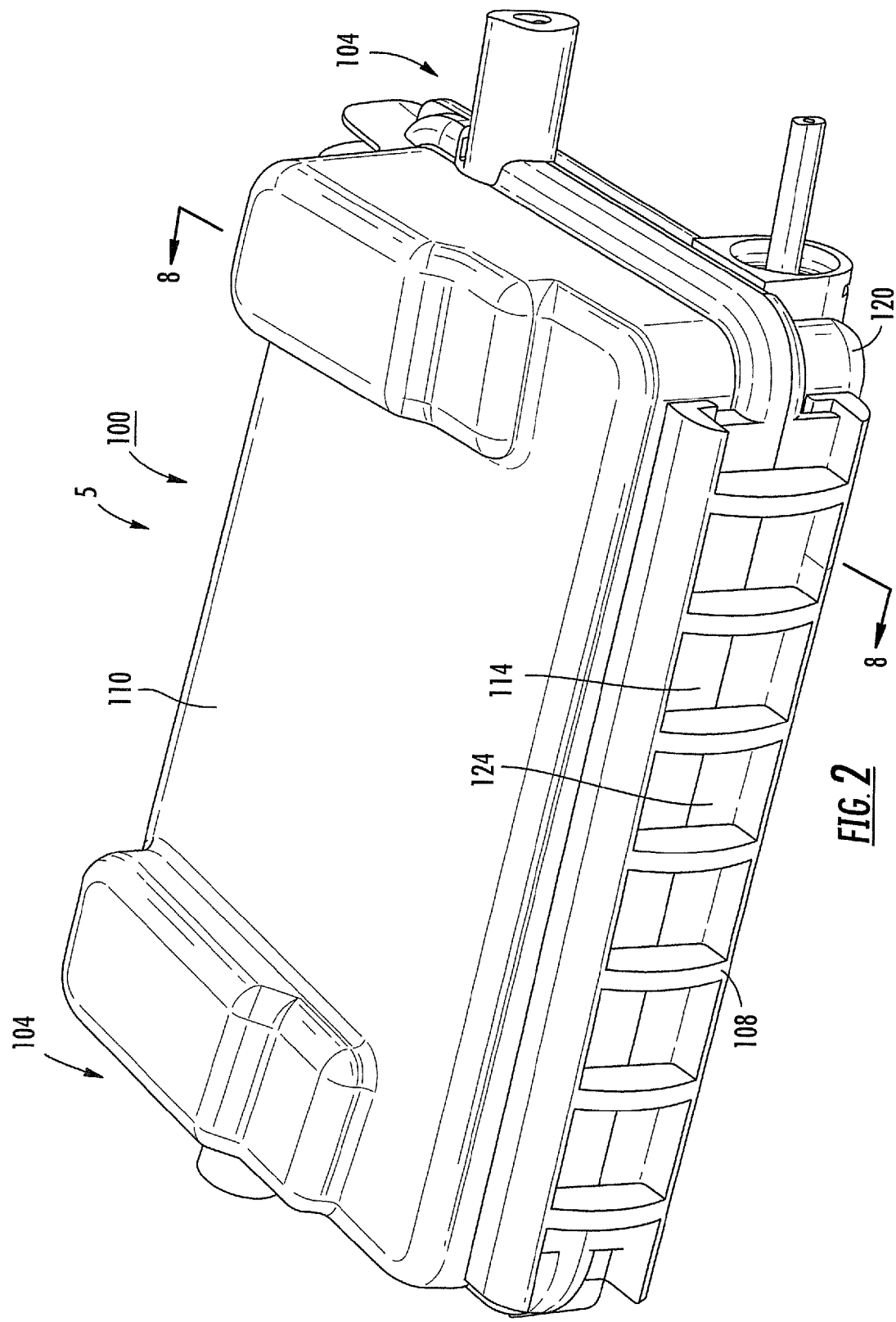
FIG. 2 is a perspective view of the cable enclosure assembly of FIG. 1 in a closed position.
Figure 7:
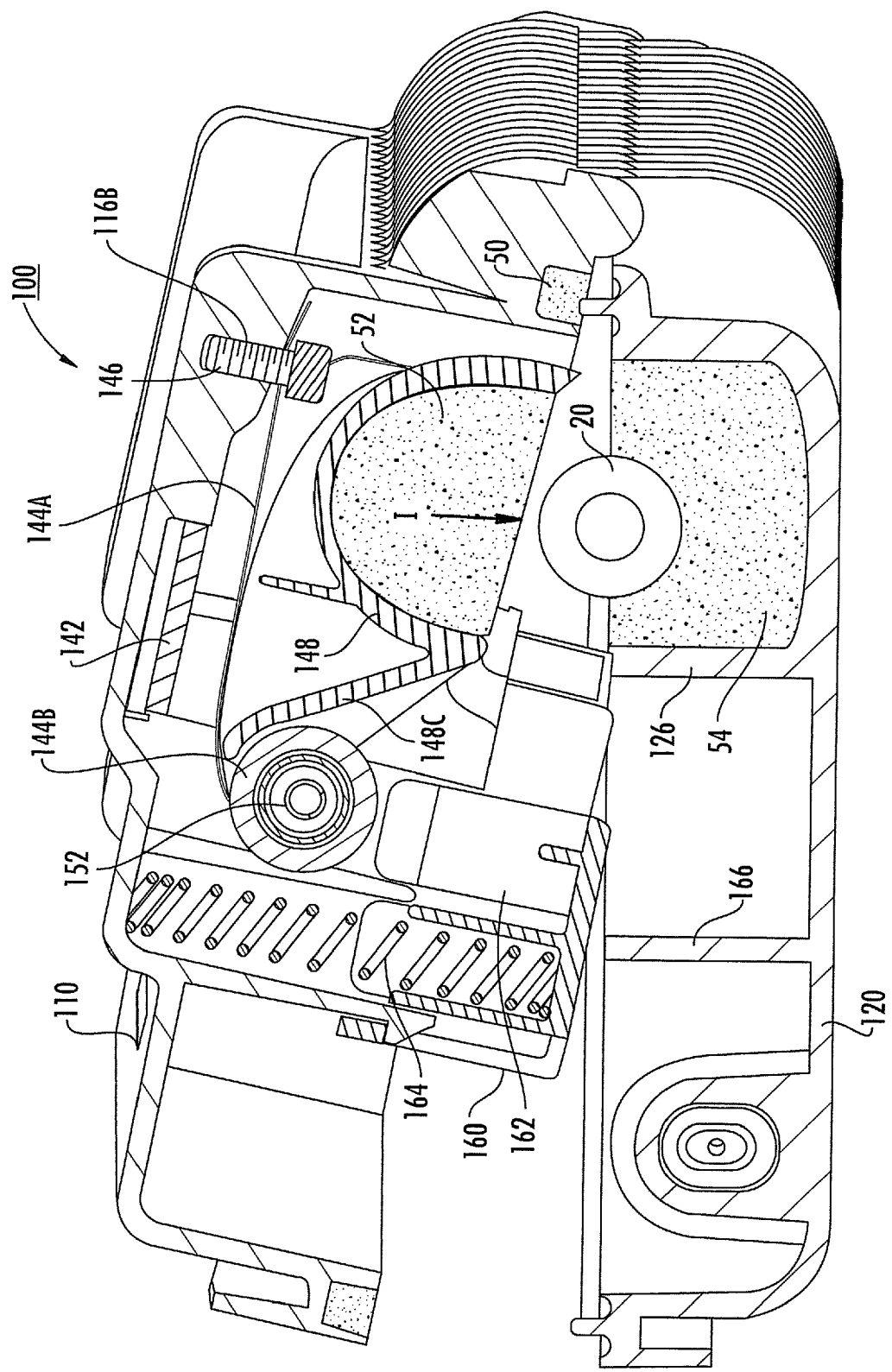
FIG. 7 is an enlarged, cross-sectional view of the cable enclosure assembly of FIG. 1 taken along the line 8-8 of FIG. 2, wherein the cable enclosure assembly is partly open, the compression mechanism and the trigger mechanism are in the cocked position, and a cable is partially installed in the cable enclosure assembly.
Figure 8:
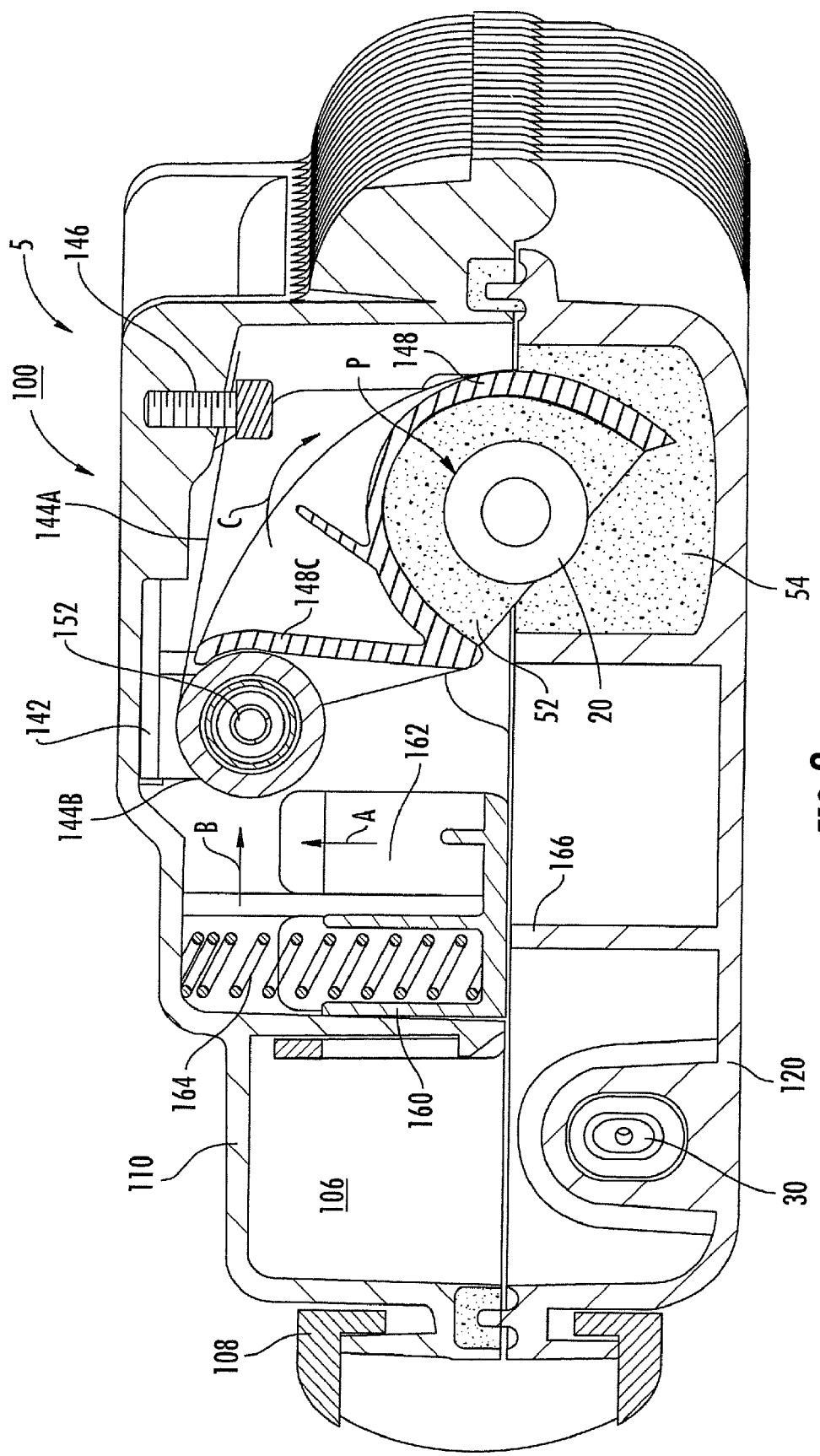
FIG. 8 is an enlarged, cross-sectional view of the cable enclosure assembly of FIG. 1 taken along the line 8-8 of FIG. 2, wherein the cable enclosure assembly is closed, the compression mechanism and the trigger mechanism are in the released position, and the cable enclosure assembly is fully closed about the cable.

The assembly 100 includes a first housing part 110 (referred to herein as the "top housing part"), a second housing part 120 (referred to herein as the "bottom housing part"), two upper masses of flowable cable sealant 52, two lower masses of flowable cable sealant 54, flowable perimeter sealant 50, a latch clip 108 (FIG. 2), and a pair of cable sealing systems 130. Each cable sealing system 130 includes a compression mechanism 140 and a trigger mechanism 150. The assembly 100 includes a hinge mechanism 102 so that the housing parts 110, 120 are relatively pivotable between an open position as shown in FIGS. 1 and 7 and a closed position as shown in FIGS. 2 and 8. In the closed position, the assembly 100 defines a chamber 106 (FIG. 8). The assembly 100 may be referred to as a clamshell cable enclosure. Cable ports 104 (FIG. 2) communicate with the chamber 106 and the exterior of the assembly 100. The assembly 100 may be used with a cable or cables 20, 30 to form splice connection assembly 5 (FIG. 2) including an optical fiber splice 35, for example.

Figure 9:
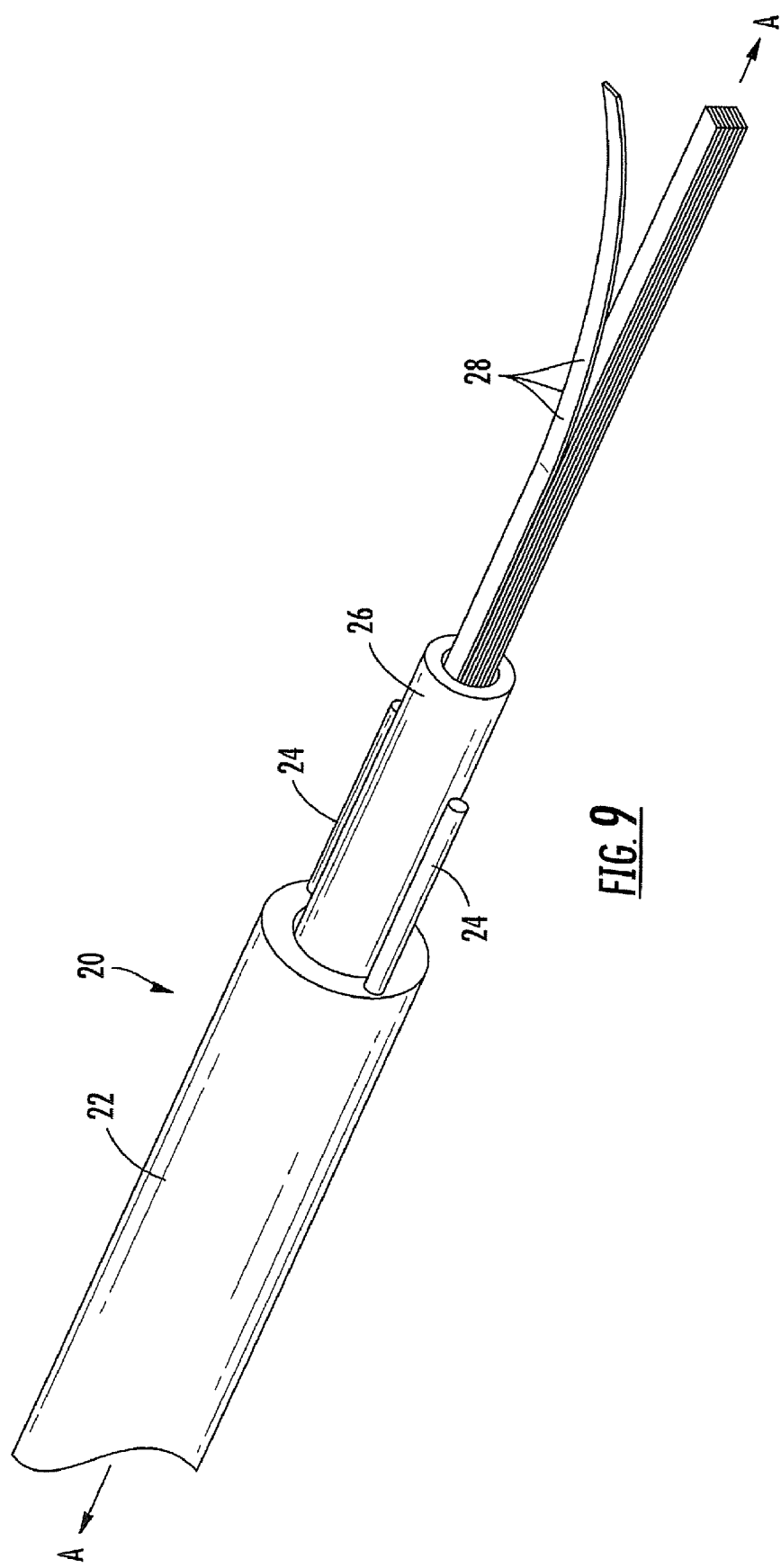
FIG. 9 is a perspective view of a fiber optic cable.

In the illustrated embodiments and as shown in more detail in FIG. 9, the cable 20 is an optical fiber cable including optical fibers (which may be arranged as stacks of multi-fiber ribbons, as shown) 28, a buffer tube 26 surrounding the optical fibers 28, a tubular outer protective jacket 22 surrounding the buffer tube 26, and a pair of strength members 24 extending between the outer protective jacket 22 and buffer tube 26 on diametrically opposed sides of the cable. The cable 20 has a central cable axis A-A that extends lengthwise (longitudinally) through the cable 20 substantially down the center of the outer protective jacket 22. The cable 30 (FIG. 1) may be a flat drop cable including one or more optical fibers 38 surrounded by a jacket 32, for example. It will be appreciated that aspects of the present invention are not limited to use of or use with cables 20, 30 as described. For example, enclosure assemblies and sealing mechanisms as described herein may be used with optical fiber cables of other constructions or other types of elongate objects (e.g., copper conductor cables).

With reference to FIG. 1, the top housing part 110 includes a body 112, hinge structures 113 (FIG. 3), a latch structure 114 (FIG. 3), a perimeter sealing channel 115, and mount structures 116. Opposed cable cutouts 116A are formed in the mount structures 116. A screw bore 116B (FIG. 7) is formed in the top housing part 110. The perimeter sealant 50 is disposed in the channel 115. The compression mechanisms 140 and the trigger mechanisms 150 are secured in respective ones of the mount structures 116.

Figure 3:
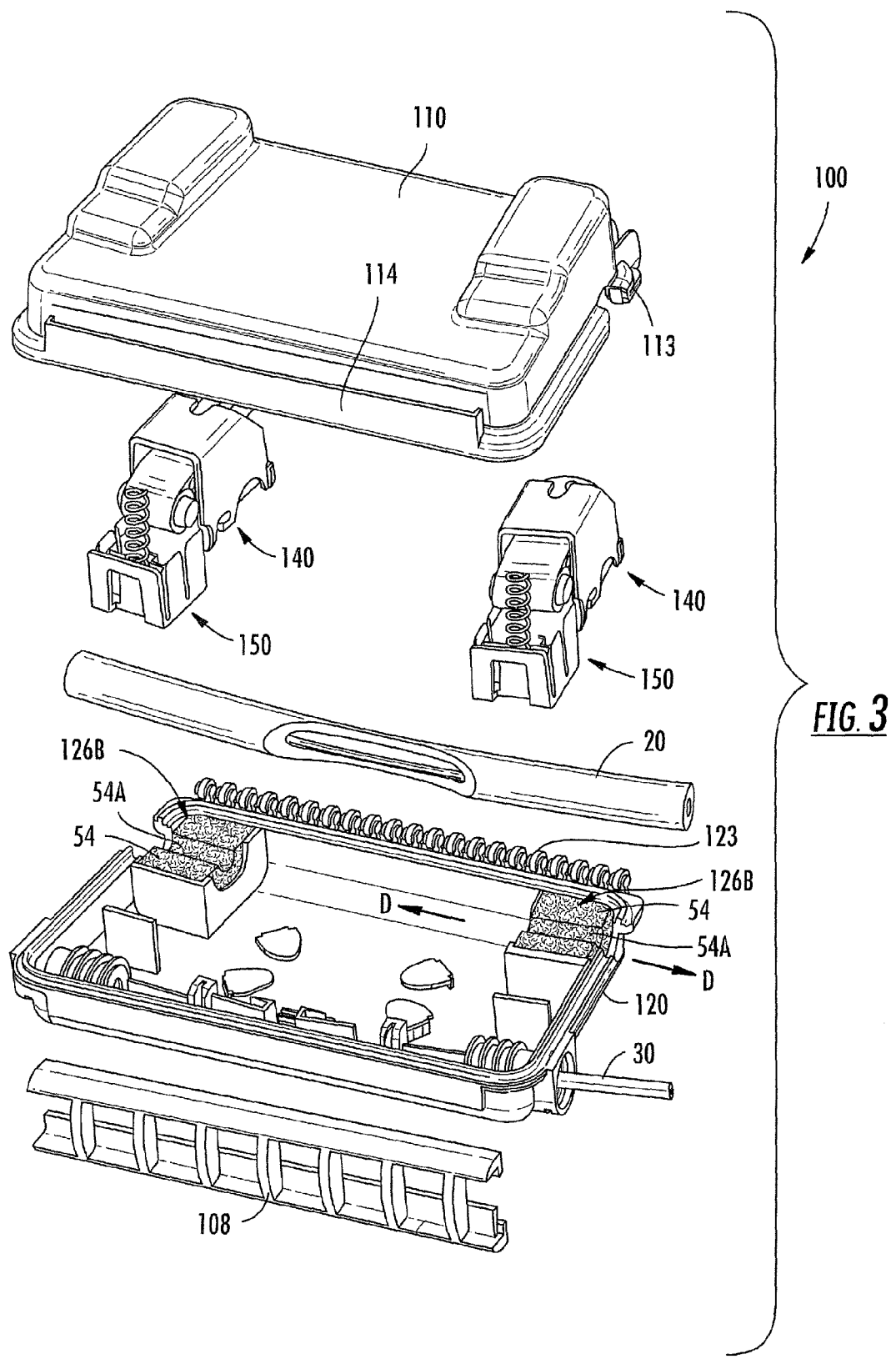
FIG. 3 is an exploded, perspective view of the cable enclosure assembly of FIG. 1.

With reference to FIGS. 1 and 3, the bottom housing part 120 includes a body 122, hinge structures 123 (FIG. 3), a latch structure 124, a perimeter sealing flange 125 (FIG. 1), a pair of containment wall structures 126. Opposed cable cutouts 126A (FIG. 1) are formed in the containment wall structures 126. The hinge structures 123 mate with the hinge structures 113 to form the hinge mechanism 102 (FIG. 1). The sealant masses 54 are disposed in sealant containment cavities 126B (FIG. 3) defined by the containment wall structures 126. A preformed cable trough 54A (FIG. 3) may be formed in each gel mass 54 and generally aligned with the cutouts 126A. The latch structures 114, 124 mate with the lock clip 108 to lock the assembly 100 in the closed position (FIG. 2). A plurality of clips may be mounted in the bottom housing part 120 and used to manage the optical fibers 28, 38. One or more splice holders may be mounted in the bottom housing part 120 and used to hold one or more splices.

The housing parts 110, 120 may each be formed of any suitable material. According to some embodiments, the housing parts 110, 120 are formed of a polymeric material. Suitable polymeric materials may include polypropylene and its derivatives, or polycarbonate, for example.

The cable sealing systems 130 may be constructed in substantially the same manner and, therefore, one of the cable sealing systems 130 will be described in more detail hereinafter, it being appreciated that this description likewise applies to the other cable sealing system 130.

Figure 4:
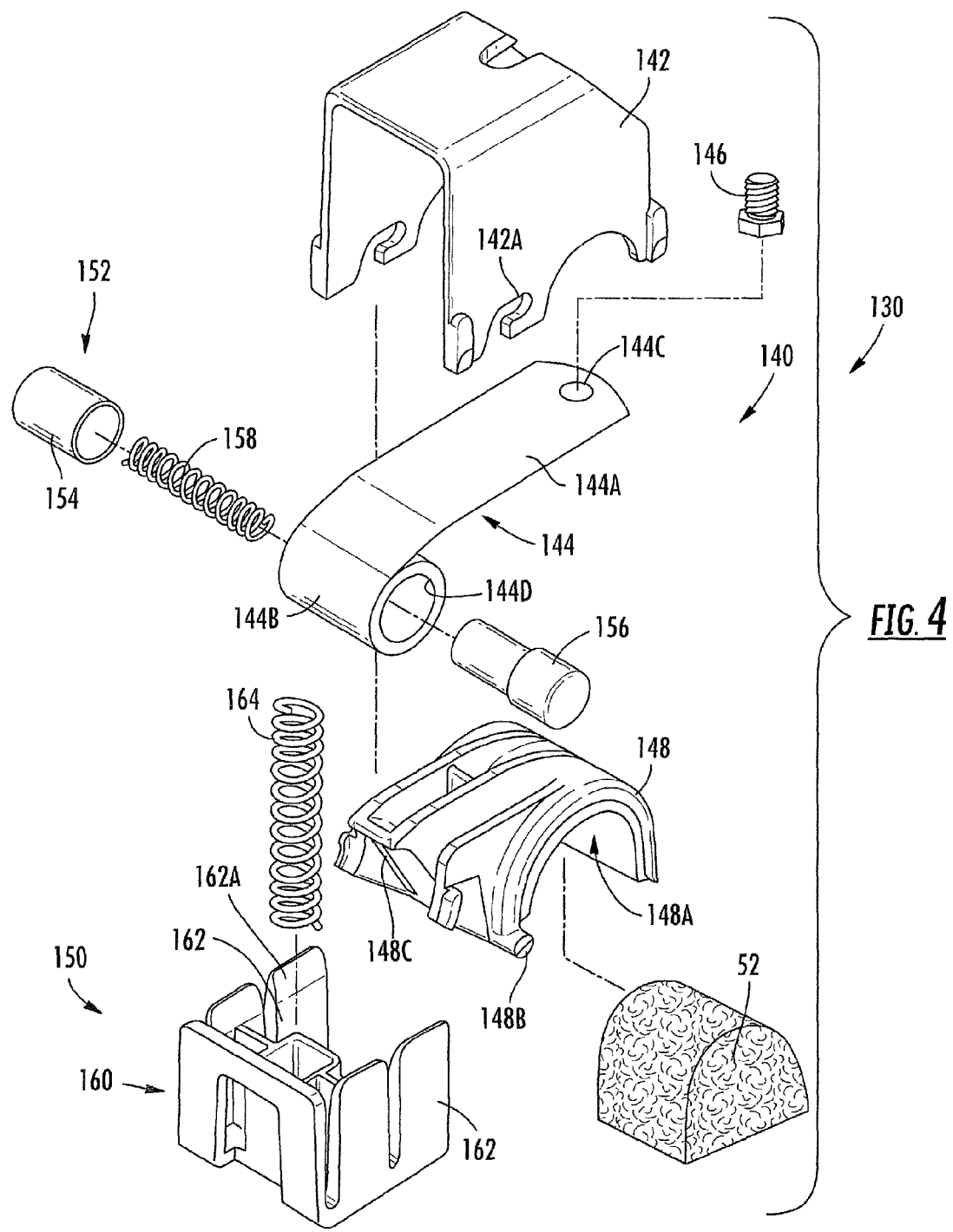
FIG. 4 is an enlarged, exploded, perspective view of a compression mechanism and a trigger mechanism forming parts of the cable enclosure assembly of FIG. 1.
Figure 5:
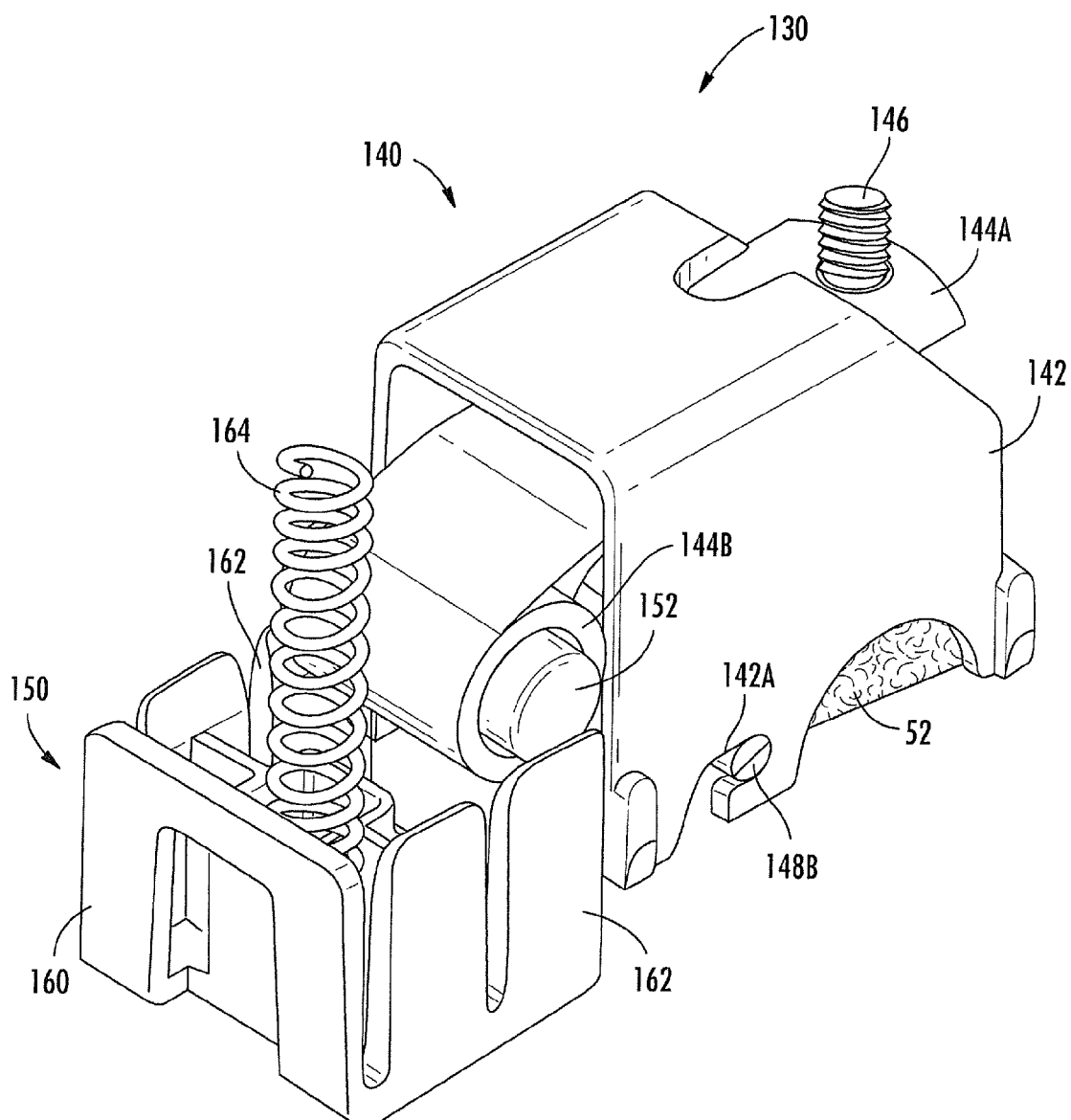
FIG. 5 is an enlarged, perspective view of the compression mechanism and the trigger mechanism of FIG. 4 in a cocked position.

With reference to FIGS. 4 and 5, the cable sealing system 130 includes a compression mechanism 140 and a trigger mechanism 150. The compression mechanism 140 and the trigger mechanism 150 can cooperate to effectively form an environmental seal about the cable 20.

The compression mechanism 140 includes a housing 142, a biasing member 144, an anchor screw 146, and a sealant driver or pressure member 148. The housing 142 has opposed hinge slots 142A. The biasing member 144 is shown as a wound spring and includes an extended strip segment 144A, a wound segment 144B, an opening 144C defined in the segment 144A, and a central opening 144D formed in the segment 144B. The pressure member 148 serves as a pressure plate and defines a sealant containment cavity 148A. The pressure member 148 has opposed hinge posts 148B and a push structure 148C.

The housing 142 and the pressure member 148 may be formed of any suitable material. According to some embodiments, the housing 142 and the pressure member 148 are formed of a polymeric material. Suitable polymeric materials may include polypropylene and its derivatives, or polycarbonate, for example.

The spring 144 may be formed of any suitable material. According to some embodiments, the spring 144 is formed of a resilient metal. Suitable metals include spring steel, stainless steel or beryllium copper, for example.

The trigger mechanism 150 includes a latch subassembly 152, an actuator 160, an actuator spring 164, and a trigger post 166 (e.g., integrally formed with the bottom housing 120; FIG. 1). The latch subassembly 152 includes a receiver part 154 and a plunger part 156 slidably received in the receiver part 154. A latch spring 158 is captured between and within the parts 154, 156 and urges the parts 154, 156 apart. The actuator 160 includes opposed arms 162, each having an upper, inner tapered section 162A.

The housing 142 is fixedly mounted in the mount structure 116 by cooperating snap interlock features, for example. The strip segment 144A is anchored to the housing 110 by a screw 146 that engages the bore 116B (FIG. 7). The latch subassembly 152 extends though the central opening 144D of the wound segment 144B, which is located in front of the housing 142 (see FIGS. 5 and 7). The wound segment 144B is extended from its relaxed position so that it applies a tension load tending to draw the latch subassembly 152 rearwardly into the housing 142. However, the ends of the latch subassembly 152 extend laterally beyond the side walls of the housing 142 so that the latch subassembly 152 is retained in front of the housing 142 and the spring 144 remains under tension.

Figure 6:
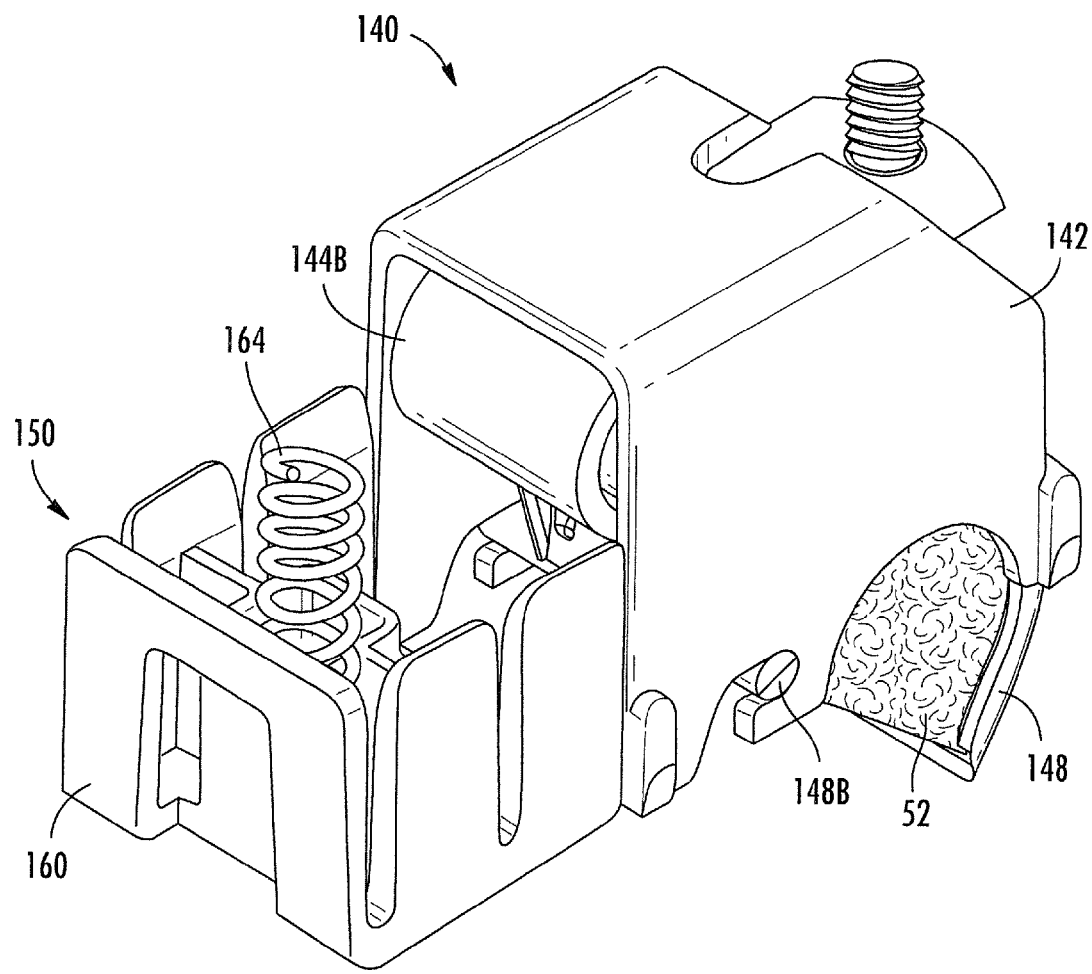
FIG. 6 is an enlarged, perspective view of the compression mechanism and the trigger mechanism of FIG. 4 in a released position.

The pressure member 148 is coupled to the front end of the housing 142 by the posts 148B and the slots 142A. The pressure member 148 can be pivoted about the posts 148B between a retracted position (as shown in FIGS. 1, 5 and 7), wherein the pressure member 148 is disposed in the housing 142, and an extended position (as shown in FIGS. 6 and 8), wherein the pressure member 148 is rotated out of the housing 142.

The actuator 160 is slidably mounted in the mount structure 116 by cooperating snap interlock features, for example. The actuator spring 164 is captured between the top housing 110 and the actuator 160 and urges the actuator 160 downwardly (i.e., away from the top housing 110) into a ready position as shown in FIGS. 5 and 7. The actuator 160 can be slid upwardly toward the housing 110, compressing the actuator spring 164, into an actuating position as shown in FIGS. 6 and 8.

The sealants 50, 52, 54 may be any suitable sealants. According to some embodiments, the sealant 50 is a gel sealant. According to some embodiments, the sealants 52, 54 are gel sealants. According to some embodiments, all of the sealants 50, 52, 54 are gel sealants. As used herein, "gel" refers to the category of materials which are solids extended by a fluid extender. The gel may be a substantially dilute system that exhibits no steady state flow. As discussed in Ferry, "Viscoelastic Properties of Polymers," $3^{rd}$ ed. P. 529 (J. Wiley & Sons, New York 1980), a polymer gel may be a cross-linked solution whether linked by chemical bonds or crystallites or some other kind of junction. The absence of the steady state flow may be considered to be the definition of the solid-like properties while the substantial dilution may be necessary to give the relatively low modulus of gels. The solid nature may be achieved by a continuous network structure formed in the material generally through crosslinking the polymer chains through some kind of junction or the creation of domains of associated substituents of various branch chains of the polymer. The crosslinking can be either physical or chemical as long as the crosslink sites may be sustained at the use conditions of the gel.

Gels for use in this invention may be silicone (organopolysiloxane) gels, such as the fluid-extended systems taught in U.S. Pat. No. 4,634,207 to Debbaut (hereinafter "Debbaut '207"); U.S. Pat. No. 4,680,233 to Camin et al.; U.S. Pat. No. 4,777,063 to Dubrow et al.; and U.S. Pat. No. 5,079,300 to Dubrow et al. (hereinafter "Dubrow '300"), the disclosures of each of which are hereby incorporated herein by reference. These fluid-extended silicone gels may be created with non-reactive fluid extenders as in the previously recited patents or with an excess of a reactive liquid, e.g., a vinyl-rich silicone fluid, such that it acts like an extender, as exemplified by the Sylgard® 527 product commercially available from Dow-Corning of Midland, Mich. or as disclosed in U.S. Pat. No. 3,020,260 to Nelson. Because curing is generally involved in the preparation of these gels, they are sometimes referred to as thermosetting gels. The gel may be a silicone gel produced from a mixture of divinyl terminated polydimethylsiloxane, tetrakis(dimethylsiloxy)silane, a platinum divinyltetramethyldisiloxane complex, commercially available from United Chemical Technologies, Inc. of Bristol, Pa., polydimethylsiloxane, and 1,3,5,7-tetravinyltetra-methylcyclotetrasiloxane (reaction inhibitor for providing adequate pot life).

Other types of gels may be used, for example, polyurethane gels as taught in the aforementioned Debbaut '261 and U.S. Pat. No. 5,140,476 to Debbaut (hereinafter "Debbaut '476") and gels based on styrene-ethylene butylenestyrene (SEBS) or styrene-ethylene propylene-styrene (SEPS) extended with an extender oil of naphthenic or nonaromatic or low aramatic content hydrocarbon oil, as described in U.S. Pat. No. 4,369,284 to Chen; U.S. Pat. No. 4,716,183 to Gamarra et al.; and U.S. Pat. No. 4,942,270 to Gamarra. The SEBS and SEPS gels comprise glassy styrenic microphases interconnected by a fluid-extended elastomeric phase. The microphase-separated styrenic domains serve as the junction points in the systems. The SEBS and SEPS gels are examples of thermoplastic systems.

Another class of gels which may be used are EPDM rubber-based gels, as described in U.S. Pat. No. 5,177,143 to Chang et al.

Yet another class of gels which may be used are based on anhydride-containing polymers, as disclosed in WO 96/23007. These gels reportedly have good thermal resistance.

The gel may include a variety of additives, including stabilizers and antioxidants such as hindered phenols (e.g., Irganox™ 1076, commercially available from Ciba-Geigy Corp. of Tarrytown, N.Y.), phosphites (e.g., Irgafos™ 168, commercially available from Ciba-Geigy Corp. of Tarrytown, N.Y.), metal deactivators (e.g., Irganox™ D1024 from Ciba-Geigy Corp. of Tarrytown, N.Y.), and sulfides (e.g., Cyanox LTDP, commercially available from American Cyanamid Co. of Wayne, N.J.), light stabilizers (e.g., Cyasorb UV-531, commercially available from American Cyanamid Co. of Wayne, N.J.), and flame retardants such as halogenated paraffins (e.g., Bromoklor 50, commercially available from Ferro Corp. of Hammond, Ind.) and/or phosphorous containing organic compounds (e.g., Fyrol PCF and Phosflex 390, both commercially available from Akzo Nobel Chemicals Inc. of Dobbs Ferry, N.Y.) and acid scavengers (e.g., DHT-4A, commercially available from Kyowa Chemical Industry Co. Ltd through Mitsui & Co. of Cleveland, Ohio, and hydrotalcite). Other suitable additives include colorants, biocides, tackifiers and the like described in "Additives for Plastics, Edition 1" published by D.A.T.A., Inc. and The International Plastics Selector, Inc., San Diego, Calif.

The hardness, stress relaxation, and tack may be measured using a Texture Technologies Texture Analyzer TA-XT2 commercially available from Texture Technologies Corp. of Scarsdale, N.Y., or like machines, having a five kilogram load cell to measure force, a 5 gram trigger, and ¼ inch (6.35 mm) stainless steel ball probe as described in Dubrow '300, the disclosure of which is incorporated herein by reference in its entirety. For example, for measuring the hardness of a gel a 60 mL glass vial with about 20 grams of gel, or alternately a stack of nine 2 inch×2 inch×⅛" thick slabs of gel, is placed in the Texture Technologies Texture Analyzer and the probe is forced into the gel at the speed of 0.2 mm/sec to a penetration distance of 4.0 mm. The hardness of the gel is the force in grams, as recorded by a computer, required to force the probe at that speed to penetrate or deform the surface of the gel specified for 4.0 mm. Higher numbers signify harder gels. The data from the Texture Analyzer TA-XT2 may be analyzed on an IBM PC or like computer, running Microsystems Ltd, XT.RA Dimension Version 2.3 software.

The tack and stress relaxation are read from the stress curve generated when the XT.RA Dimension version 2.3 software automatically traces the force versus time curve experienced by the load cell when the penetration speed is 2.0 mm/second and the probe is forced into the gel a penetration distance of about 4.0 mm. The probe is held at 4.0 mm penetration for 1 minute and withdrawn at a speed of 2.00 mm/second. The stress relaxation is the ratio of the initial force ($F_i$) resisting the probe at the pre-set penetration depth minus the force resisting the probe ($F_f$) after 1 min divided by the initial force $F_i$, expressed as a percentage. That is, percent stress relaxation is equal to $$\frac{(F_i - F_f)}{F_i} \times 100\%$$

where $F_i$ and $F_f$ are in grams. In other words, the stress relaxation is the ratio of the initial force minus the force after 1 minute over the initial force. It may be considered to be a measure of the ability of the gel to relax any induced compression placed on the gel. The tack may be considered to be the amount of force in grams resistance on the probe as it is pulled out of the gel when the probe is withdrawn at a speed of 2.0 mm/second from the preset penetration depth.

An alternative way to characterize the gels is by cone penetration parameters according to ASTM D-217 as proposed in Debbaut '261; Debbaut '207; Debbaut '746; and U.S. Pat. No. 5,357,057 to Debbaut et al., each of which is incorporated herein by reference in its entirety. Cone penetration ("CP") values may range from about 70 ($10^{-1}$ mm) to about 400 ($10^{-1}$ mm). Harder gels may generally have CP values from about 70 ($10^{-1}$ mm) to about 120 ($10^{-1}$ mm). Softer gels may generally have CP values from about 200 ($10^{-1}$ mm) to about 400 ($10^{-1}$ mm), with particularly preferred range of from about 250 ($10^{-1}$ mm) to about 375 ($10^{-1}$ mm). For a particular materials system, a relationship between CP and Voland gram hardness can be developed as proposed in U.S. Pat. No. 4,852,646 to Dittmer et al.

According to some embodiments, the gel has a Voland hardness, as measured by a texture analyzer, of between about 5 and 100 grams force. The gel may have an elongation, as measured by ASTM D-638, of at least 55%. According to some embodiments, the elongation is of at least 100%. The gel may have a stress relaxation of less than 80%. The gel may have a tack greater than about 1 gram.

While, in accordance with some embodiments, the sealants 50, 52, 54 are gels as described above, other types of sealants may be employed. For example, the sealants 50, 52, 54 may be silicone grease or hydrocarbon-based grease.

The assembly 100 may be used in the following manner to form a splice connection assembly 5, for example. The compression mechanisms 140 and the trigger mechanisms 150 are initially in their cocked positions. The cables 20, 30 are prepared as needed. One or more splices may be formed between the cable 20 and the cable 30. The cable 20 is placed in each sealant trough 54A and the cable cutouts 126A so that the cable 20 extends generally along a lengthwise cable passthrough axis D-D (FIG. 3) of each cable port 104 as shown in FIGS. 1 and 7. The installed portions of the cable 20 may be at least partially surrounded by the respective cable sealants 54. The cable 20 may be pressed downwardly so that the cable 20 displaces the cable sealant 54.

With the cable 20 thus partially installed, the top housing part 110 and the bottom housing part 120 can be relatively pivoted about the hinge 102 into the closed position. As discussed in more detail below, as the housing parts 110, 120 are closed, the trigger mechanisms 150 may be triggered to actuate the associated compression mechanisms 140. The operation of the two trigger mechanisms 150 and of the two compression mechanisms 140 can be substantially the same. Therefore, only one set of the mechanisms 140, 150 will be discussed hereinbelow, it being appreciated that the discussion likewise applies to the other set of mechanisms 140, 150.

FIGS. 7 and 8 show a closure sequence of the assembly 100. Initially, the compression mechanism 140 and the trigger mechanism 150 are in a cocked or ready position as shown in FIG. 7. In FIG. 7, the assembly 100 is in an almost closed position. As the top housing part 110 is further closed onto the bottom housing part 120, the actuator 160 impacts and is pushed upwardly (in a direction A; FIG. 8) toward the top housing part 110 by the trigger post 166 and against the bias of the actuator spring 164 to automatically trigger the trigger mechanism 150 and fire the compression mechanism 140. More particularly, the arms 162 engage the ends of the latch subassembly 152 and force the latch subassembly 152 to laterally compress against the bias of the latch spring 158 (FIG. 5). This reduces the length of the latch assembly 152, thereby permitting the tension force of the pre-loaded, wound spring 144 (which is anchored to the housing part 110 by the screw 146) to draw the wound spring segment 144B rearwardly (in a direction B; FIG. 8) against the push structure 148C of the pressure member 148. In this manner, the spring 144 is released to forcibly pivot or rotate (in a direction C; FIG. 8) the pressure member 148 into an extended position as shown in FIG. 8. The sealant 52 therein is thus forcibly applied to and about the portion of the cable 20 to provide a compressively loaded sealant seal about the cable portion.

The actuated compression mechanism may forcibly displace the sealant 52 and/or the sealant 54 to flow about the cable 20. According to some embodiments, the sealants 52, 54 are gels that are elastically displaced (and, according to some embodiments, elastically elongated) by the compressive loading. According to some embodiments, the compression member 140 forces the cable sealant 52 to flow about the cable 20 in a direction transverse (e.g., perpendicular) or generally radial to the cable lengthwise axis A-A (FIG. 9). The spring 144 applies a compressive load to the cable sealant 52 via the pressure member 148 in a direction P (FIG. 8) inwardly towards the cable 20 and substantially transverse (e.g., perpendicular) to the cable lengthwise axis A-A.

According to some embodiments, for example, as illustrated, the compression mechanism 140 is not fired (i.e., the force of the spring 144 is not exerted on the sealant 52) until the assembly 100 is being applied to the cable 20. According to some embodiments, for example, as illustrated, the compression mechanism 140 is not released until just before the housing parts 110, 120 are completely closed and, according to some embodiments, such release is automatically actuated just prior to closure.

According to some embodiments, the spring 144 remains nonrelaxed once the housing parts 110, 120 are closed so that the spring 144 continues to provide a persistent compressive load to the sealant 52. That is, the spring 144 always maintains a positive pressure or load on the sealant 52 so long as the housing parts 110, 120 are closed. Maintaining positive pressure in this manner may help to maintain the integrity of the seal even after plastic deformation of the cable 20 or the housing parts 110, 120, exudation of the sealant 52, 54, or the like. According to some embodiments, the compressive load on the cable 20 after the assembly 100 is fully closed is at least 10 KPa and, according to some embodiments, in the range of from about 10 to 70 KPa.

Once the housing parts 110, 130 are closed, the clip 108 can be applied to the latch structures 114, 124 to secure the assembly 100 in its closed position.

The closure of the assembly 100 may also provide a perimeter environmental seal. The perimeter seal is created by the sealant channel 115, the perimeter sealant 50 and the perimeter flange 125. As the housing parts 110, 130 are closed, the flange 125 enters the channel 115 and displaces the sealant 50. This perimeter seal may be maintained so long as the latch structures remain interlocked.

According to some embodiments, the sealant 50 is fluidly connected to the sealant 52 and/or the sealant 54, at least after the compression mechanisms 140 have been released or fired to form the seals about the cable 20. According to some embodiments, the sealant 50 is formed from a different material (e.g., a different type or composition of gel sealant) than the sealants 52, 54. According to some embodiments and as illustrated, the perimeter sealant 50 is only provided in one of the housing parts 110, 120 while the cable sealing sealants 52, 54 are provided in both housing parts 110, 120.

The assembly 100 may provide a reliable (and, in at least some embodiments, moisture-tight) seal between the assembly 100 and the cable 20. The sealants 52, 54 may accommodate cables of different sizes within a prescribed range. In particular, the adaptive and dynamic response or accommodation of the sealant systems 130 can enable the assembly 100 to effectively seal about a relatively large range of cable sizes.

When the sealant 52, 54 is a gel and the compression feature 120 applies a compressive force to the sealant 52, 54, the gel is thereby elongated and is generally deformed and substantially conforms to the outer surface of the cable 20 and to the inner surfaces of the assembly 100. Some shearing of the gel may occur as well. At least some of the gel deformation may be elastic. The restoring force in the gel resulting from this elastic deformation causes the gel to operate as a spring exerting an expansive force between the assembly 100 and the cable 20.

Various properties of the gel, as described above, may ensure that the gel sealant 52, 54 maintains a reliable and long lasting (and, in some cases, hermetic) seal between the assembly 100 and the cable 20. The elastic memory and the retained or restoring force in the elongated, elastically deformed gel generally cause the gel to bear against the mating surfaces of the cable 20 and the assembly 100. Also, the tack of the gel may provide adhesion between the gel and these surfaces. The gel, even though it may be cold-applied, is generally able to flow about the cable 20 and the assembly 100 to accommodate their irregular geometries. According to some embodiments, each sealant 50, 52, 54 is a self-healing or self-amalgamating gel.

With reference to FIGS. 10-18, an elongate member sealing or enclosure assembly 200 according to further embodiments of the present invention is shown therein. The assembly 200 includes a top housing part 210, a bottom housing part 220, two upper masses of flowable cable sealant 62, two lower masses of flowable cable sealant 64, a flowable perimeter sealant 60, and a latch clip 208 (FIG. 11) generally corresponding to the housing parts 110, 120, the sealant masses 52, 54, 50, and the clip 108, respectively, of the assembly 100.

Figure 10:
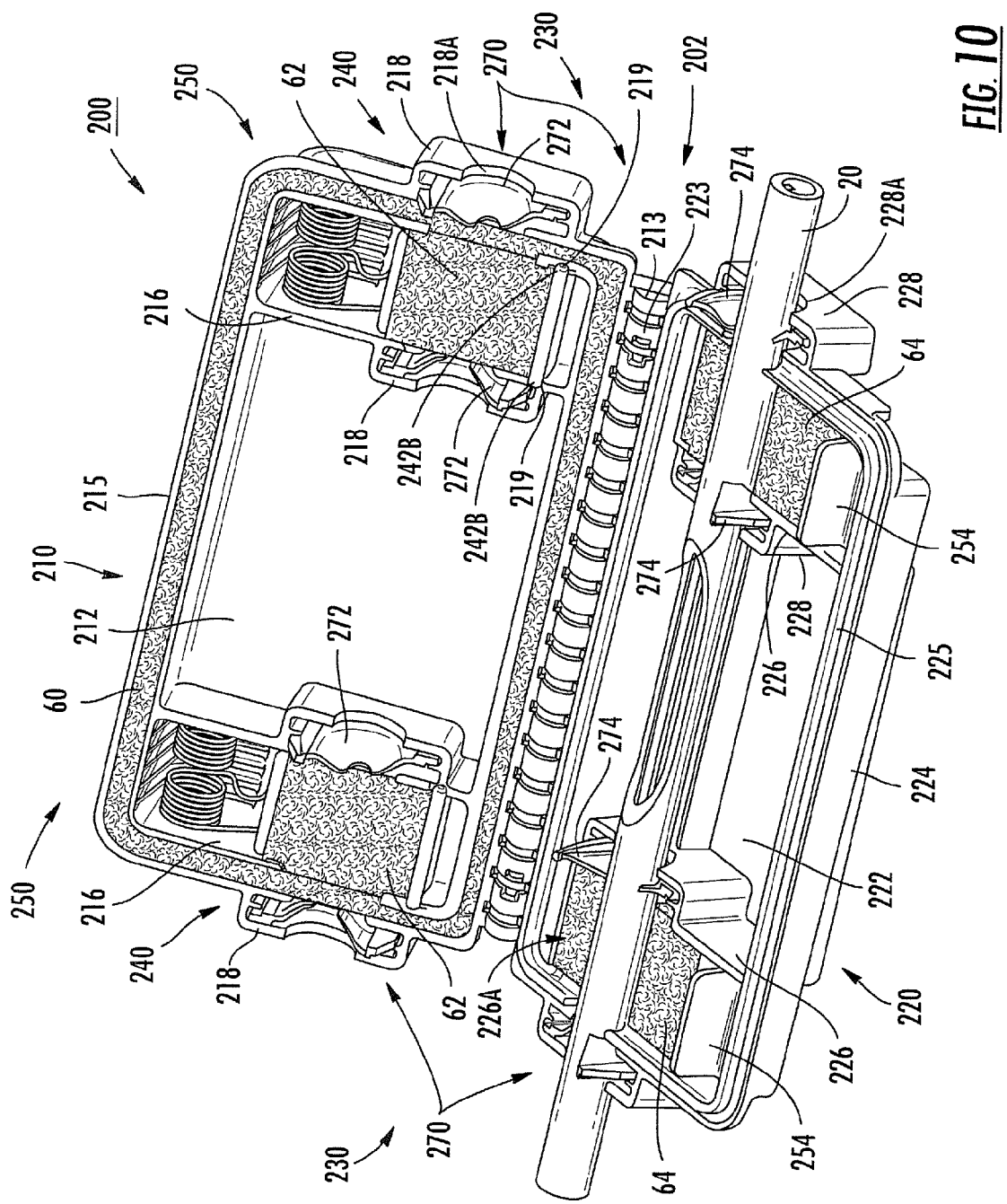
FIG. 10 is a perspective view of a cable enclosure assembly according to further embodiments of the present invention in an open position.
Figure 11:
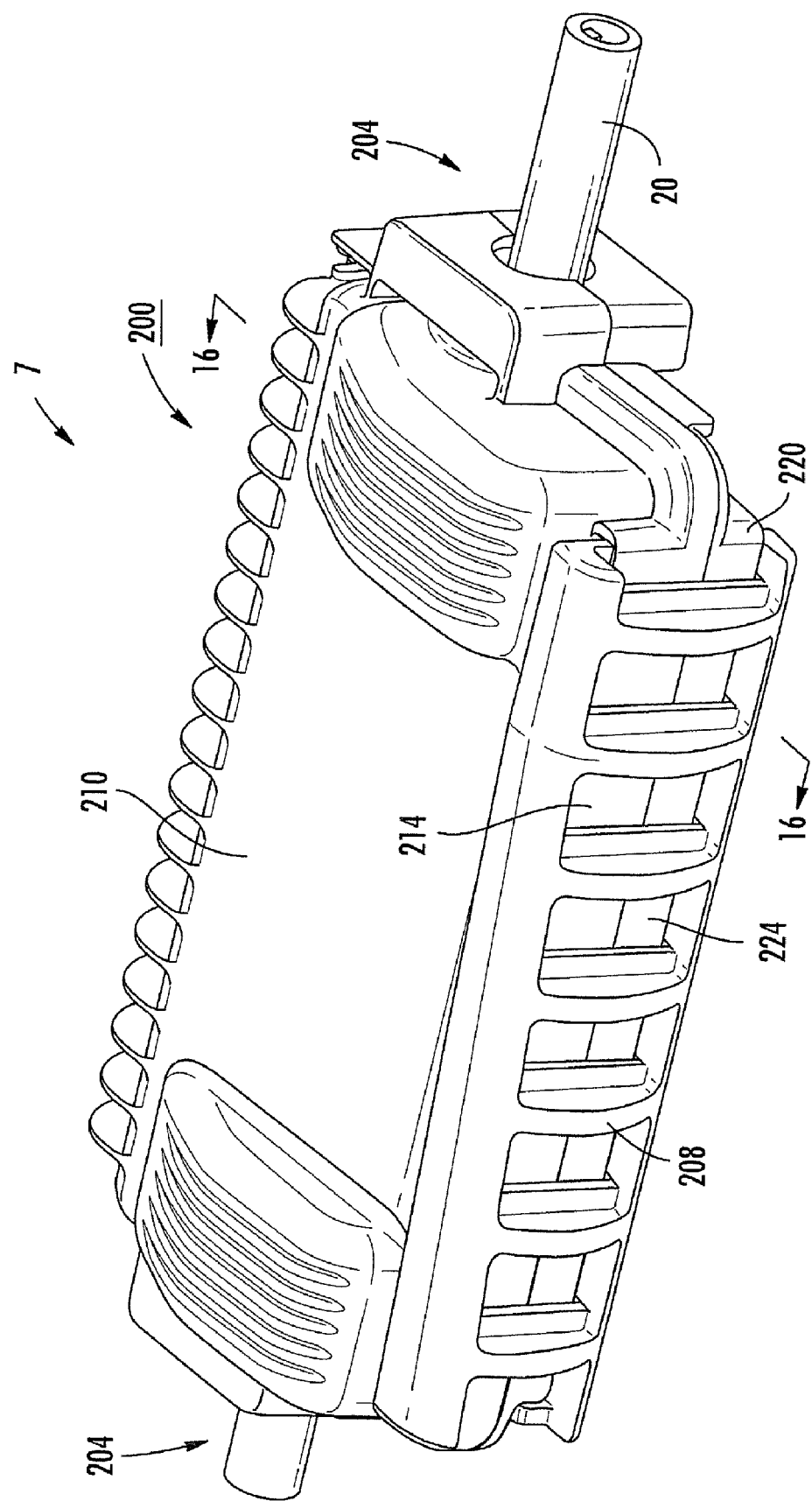
FIG. 11 is a perspective view of the cable enclosure assembly of FIG. 10 in a closed position.
Figure 12:
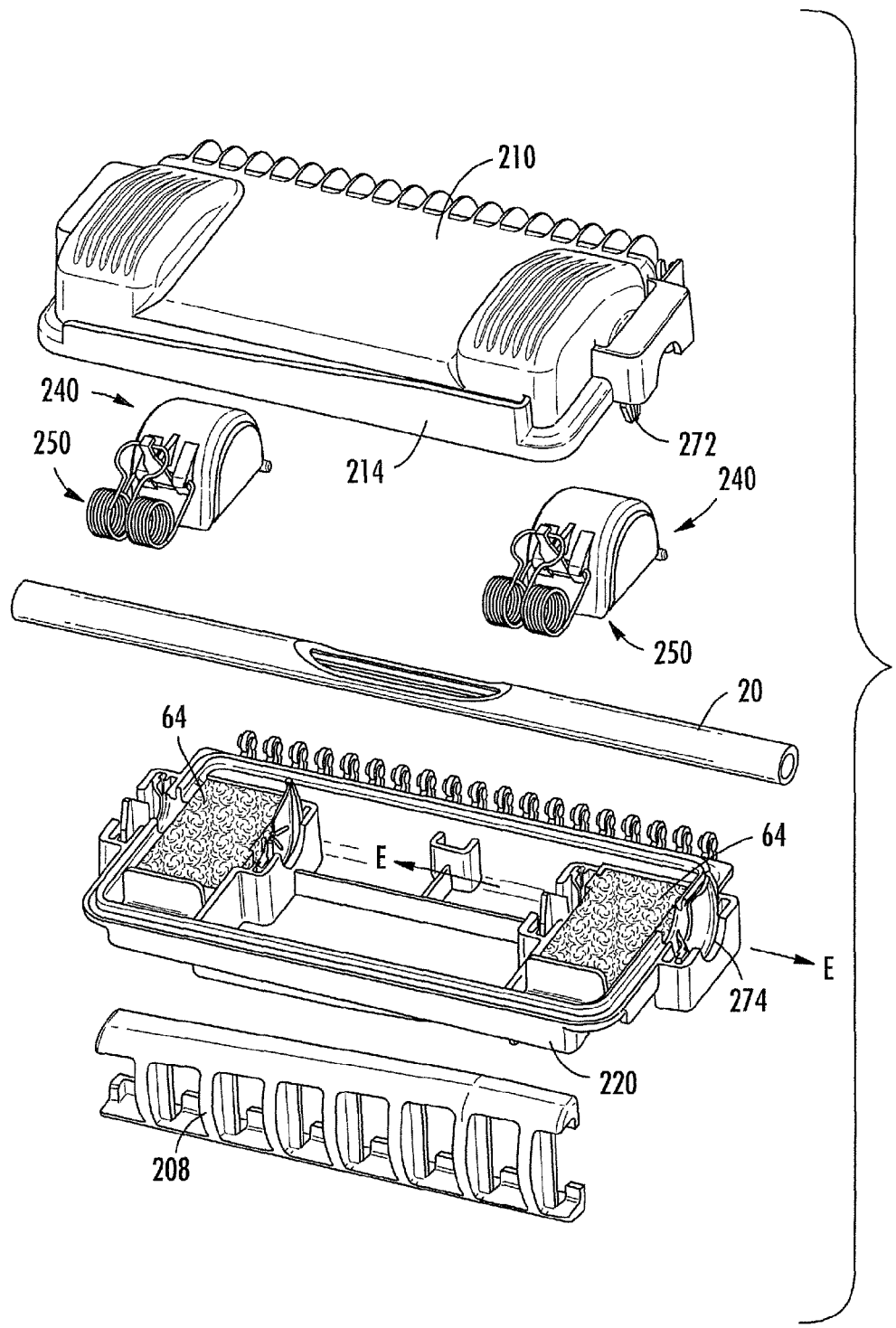
FIG. 12 is an exploded, perspective view of the cable enclosure assembly of FIG. 10.
Figure 15:
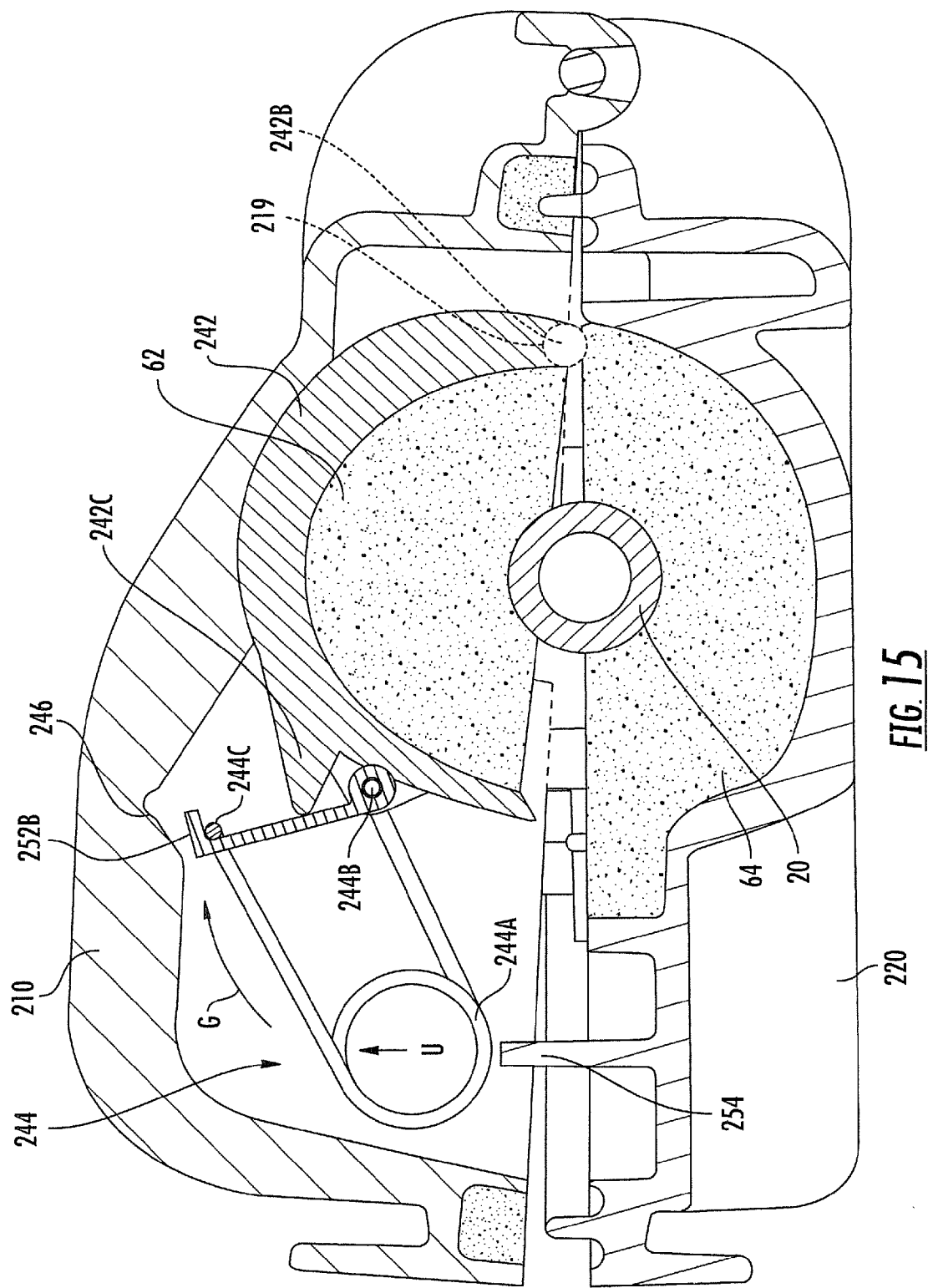
FIG. 15 is an enlarged, cross-sectional view of the cable enclosure assembly of FIG. 10 taken along the line 16-16 of FIG. 11, wherein the cable enclosure assembly is partly open, the compression mechanism and the trigger mechanism are in the cocked position, and a cable is partially installed in the cable enclosure assembly.
Figure 16:
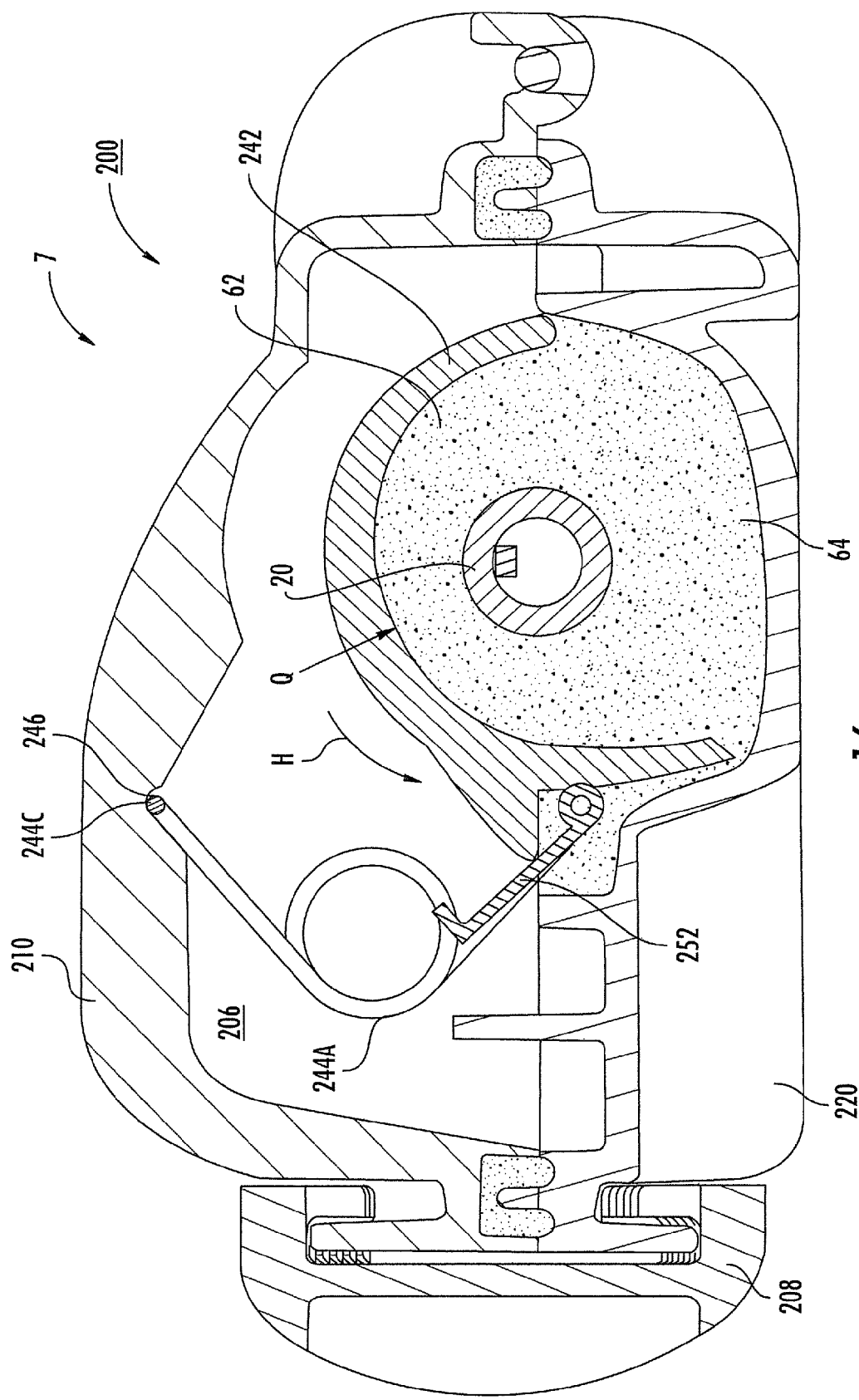
FIG. 16 is an enlarged, cross-sectional view of the cable enclosure assembly of FIG. 10 taken along the line 16-16 of FIG. 11, wherein the cable enclosure assembly is closed, the compression mechanism and the trigger mechanism are in a released position, and the cable enclosure assembly is fully closed about the cable.

The assembly 200 includes a hinge mechanism 202 so that the housing parts 210, 220 are relatively pivotable between an open position as shown in FIG. 10 or 15 and a closed position as shown in FIGS. 11 and 16. In the closed position, the assembly 200 defines a chamber 206 (FIG. 16). Cable ports 204 (FIG. 11) communicate with the chamber 206 and the exterior of the assembly 200. The assembly 200 may be used with a cable or cables 20 to form an enclosed cable assembly 7 (FIG. 11) to environmentally protect an opening formed in the jacket of the cable 20, for example. The assembly 200 also includes a pair of cable sealing systems 230. Each cable sealing system 230 includes a compression mechanism 240, a trigger mechanism 250, and a multi-part cable entry grommet system 270.

With reference to FIG. 10, the top housing part 210 includes a body 212, hinge structures 213, a latch structure 214 (FIG. 12), a perimeter sealing channel 215, compression mechanism mount structures 216, grommet mount structures 218, and pivot slots 219 (FIG. 10). Opposed cable cutouts 218A are formed in the grommet mount structures 218. The perimeter sealant 60 is disposed in the channel 215. The compression mechanisms 240 and the trigger mechanisms 250 are secured in respective ones of the mount structures 216.

The bottom housing part 220 includes a body 222, hinge structures 223, a latch structure 224, a perimeter sealing flange 225 (FIG. 10), a pair of containment wall structures 226, and grommet mount structures 228. Opposed cable cutouts 228A are formed in the grommet mount structures 228. The hinge structures 223 mate with the hinge structures 213 to form the hinge mechanism 202. The sealant masses 64 are disposed in cavities 226A defined by the containment wall structures 226. A preformed cable trough (not shown) may be formed in each gel mass 64 and generally aligned with the cutouts 228A (FIG. 10). The latch structures 214, 224 mate with the lock clip 208 to lock the assembly 200 in the closed position (FIG. 11).

The cable sealing systems 230 may be constructed in substantially the same manner and, therefore, one of the cable sealing systems 230 will be described in more detail hereinafter, it being appreciated that this description likewise applies to the other cable sealing system 230.

The cable sealing system 230 includes a compression mechanism 240, and a trigger mechanism 250, and may include a grommet system 270. The compression mechanism 240, the trigger mechanism 250 and the grommet system 270 can cooperate to effectively form an environmental seal about the cable 20.

The compression mechanism 240 includes a sealant driver or pressure member 242, a biasing member 244 and a spring seat 246 (defined in the top housing part 210; FIG. 15).

Figure 13:
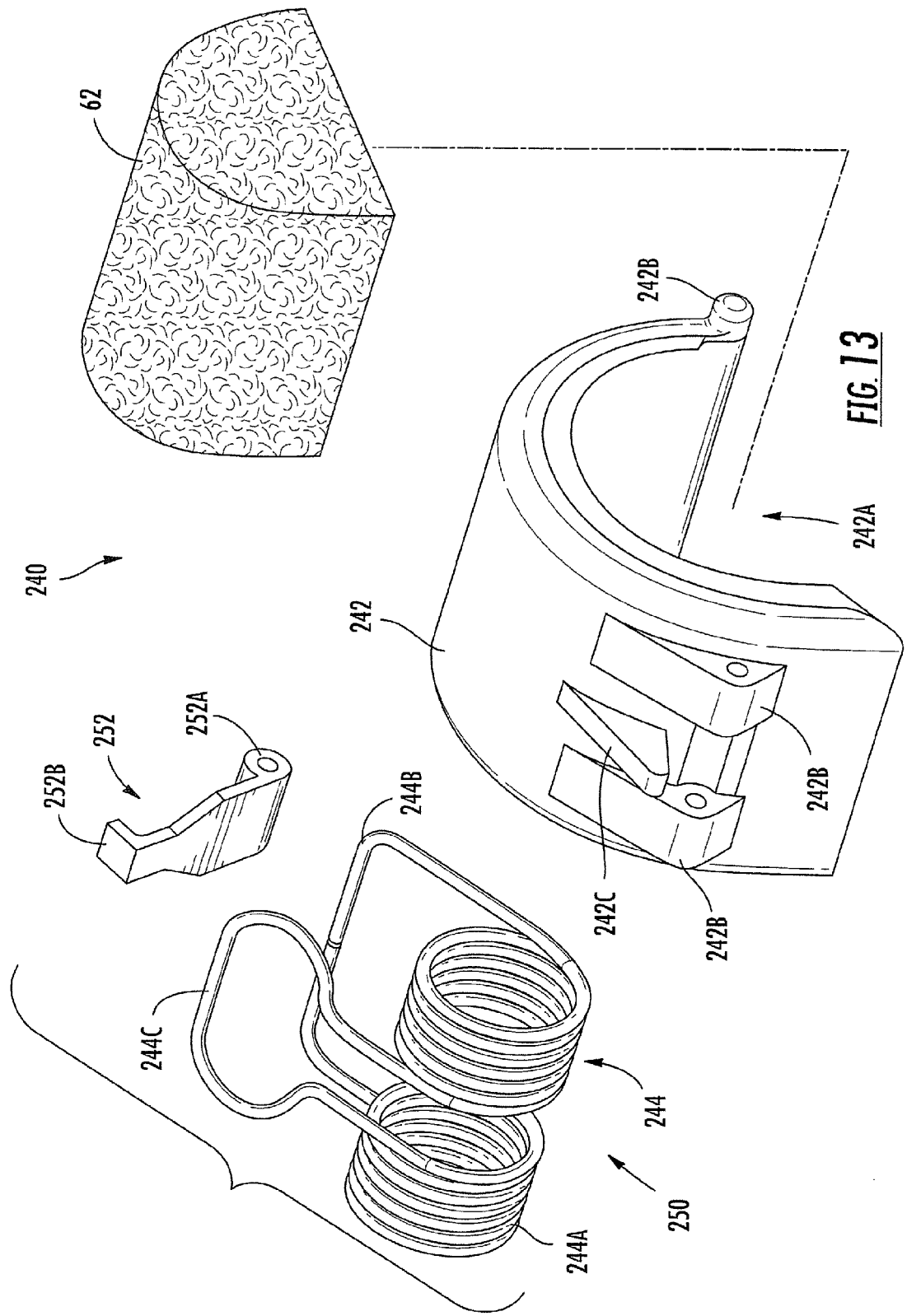
FIG. 13 is an enlarged, exploded, perspective view of a compression mechanism and a trigger mechanism forming parts of the cable enclosure assembly of FIG. 10.

As seen in FIG. 13, the pressure member 242 defines a cavity 242A and the sealant mass 62 is disposed in the sealant carrier cavity 242A The pressure member 242 includes opposed pivot posts 242B pivotally mounted in the slots 219. The pressure member 242 further includes spring pivot posts 242C and a latch locator post 242D.

The biasing member 244 may be a spring of any suitable type, such as a coil spring as shown. The spring 244 includes a coiled segment 244A, a bottom extension 244B and a top extension 244C.

The trigger mechanism 250 includes a latch pin 252 and a trigger post 254 (FIG. 10; formed on the bottom housing part 220, for example). The latch pin 252 includes a hinge structure 252A and a hook structure 252B.

Figure 14:
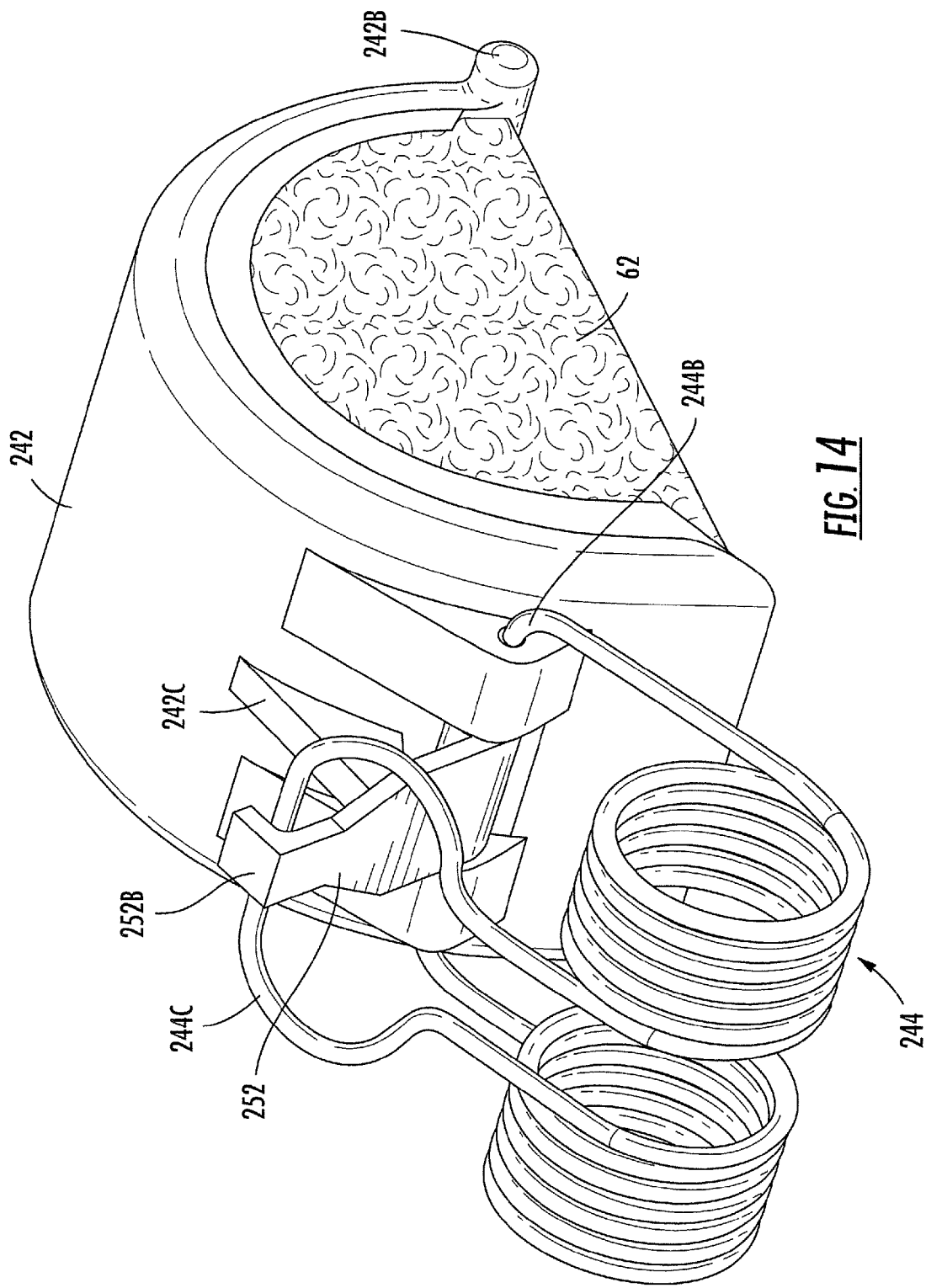
FIG. 14 is an enlarged, perspective view of the compression mechanism and the trigger mechanism of FIG. 13 in a cocked position.

The pressure member 242 is pivotally secured to the top housing part 210 by engagement between the hinge posts 242B and the hinge slots 219. The latch pin 252 is pivotally coupled to the pressure member 242 by the spring bottom extension 244B, which extends through each of the spring pivot posts 242C and the latch pin hinge structure 252A. In a ready or cocked position as shown in FIGS. 10, 14 and 15, the top extension 244C of the spring 244 is retained by the hook portion 252B of the latch pin 252. In this position, the latch pin 252 holds the spring 244 in a compressed condition (i.e., the extensions 244B and 244C are biased away from one another by the spring force).

The pressure member 242 and the latch pin 252 may be formed of any suitable material. According to some embodiments, the pressure member 242 is formed of a polymeric material. Suitable polymeric materials may include polypropylene and its derivatives, or polycarbonate, for example.

The spring 244 may be formed of any suitable material. According to some embodiments, the spring 244 is formed of a resilient metal. Suitable metals include stainless steel, spring steel, or spring phosphor bronzes, for example. Other suitable materials include polymeric spring materials.

The sealants 60, 62, 64 may be formed of materials as discussed above with regard to the sealants 50, 52, 54.

The assembly 200 may be used in the following manner to form a splice connection assembly 7 (FIG. 11), for example. The compression mechanisms 240 and the trigger mechanisms 250 are initially in their cocked positions (FIGS. 14 and 15). The cable 20 is prepared as needed. The cable 20 is placed in each sealant mass 64 and the cable cutouts 228A so that the cable 20 extends generally along a cable passthrough axis E-E (FIG. 12) of each cable port 204 as shown in FIGS. 10 and 15. The installed portions of the cable 20 may be at least partially surrounded by the respective cable sealants 64. The cable 20 may be pressed downwardly so that the cable 20 displaces the cable sealant 64.

With the cable 20 thus partially installed, the top housing part 210 and the bottom housing part 220 can be relatively pivoted about the hinge 202 into the closed position. As discussed in more detail below, as the housing parts 210, 220 are closed, the trigger mechanisms 250 may be triggered to actuate the associated compression mechanisms 240. The operation of the trigger mechanisms 250 and of the two compression mechanisms 240 can be substantially the same. Therefore, only one set of the mechanisms 240, 250 will be discussed hereinbelow, it being appreciated that the discussion likewise applies to the other set of mechanisms 240, 250.

FIGS. 15 and 16 show a closure sequence of the assembly 200. Initially, the compression mechanism 240 and the trigger mechanism 250 are in a cocked or ready position as shown in FIG. 15. As the top housing part 210 approaches the bottom housing part 220, the coiled segment 244A of the spring 244 impacts and is pushed upwardly (in a direction U; FIG. 15) toward the top housing part 210 by the trigger post 254. This causes the spring 244 to pivot upwardly (in a direction G FIG. 15) about the posts 242B. Because rotation of the latch pin 252 is limited by the latch locator post 242C, continued rotation of the spring 244 forces the spring extension rearward and free of the hook portion 252B. The spring 244 is thereby released and permitted to expand such that the top extension 244C seats in the seat 246 and the spring force (reacting against the top housing part 210), pushes downwardly (in a direction H; FIG. 16) on the pressure member 242 via the pivot posts 242C and into an extended position as shown in FIG. 16. The sealant 62 in the sealant carrier is thus forcibly applied to and about the portion of the cable 20 to provide a compressively loaded sealant seal about the cable portion.

The actuated compression mechanism 240 may forcibly displace the sealant 62 and/or the sealant 64 to flow about the cable 20. According to some embodiments, the sealants 62, 64 are gels that are elastically elongated by the compressive loading. According to some embodiments, the compression member 240 forces the cable sealant 62 to flow about the cable 20 in a direction transverse (e.g., perpendicular) or generally radial to the cable lengthwise axis A-A (FIG. 9). The pressure member 242 applies a compressive load via the pressure member 242 to the cable sealant 62 in a direction Q (FIG. 16) toward the cable 20 and substantially transverse (e.g., perpendicular) to the cable lengthwise axis A-A.

Once the housing parts 210, 230 are closed, the clip 208 can be applied to the latch structures 214, 224 to secure the assembly 200 in its closed position.

The closure of the assembly 100 also may provide a perimeter environmental seal by the sealant channel 215, the perimeter sealant 60 and the perimeter flange 225.

The sealing systems 230 may provide the various advantages and be configured to function as discussed above with regard to the sealing systems 130 and the assembly 100. For example, according to some embodiments, the trigger mechanisms 250 are automatically actuated upon or just prior to complete closing of the housing parts 210, 220, and the springs 244 maintain a positive pressure or load on the sealant 62 after the assembly 100 is closed.

The cable entry grommet systems 270 may enhance the operation of the compression mechanisms 240. The grommet systems 270 may be constructed in substantially the same manner and, therefore, one of the grommet systems 270 will be described in more detail hereinafter, it being appreciated that this description likewise applies to the other grommet system 270.

Figure 17:
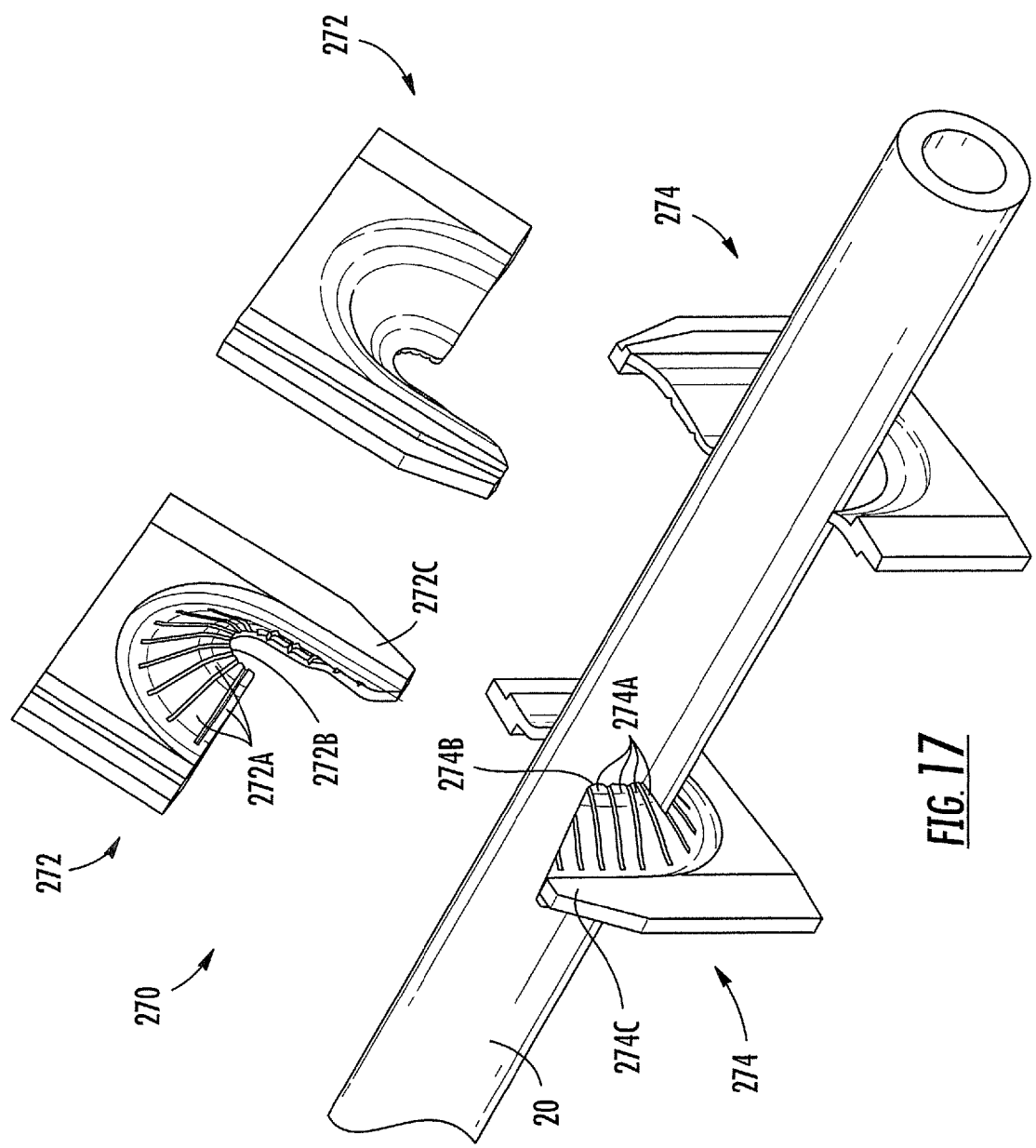
FIG. 17 is an enlarged, perspective view of a cable entry grommet system forming a part of the cable enclosure assembly of FIG. 10 in an open position.
Figure 18:
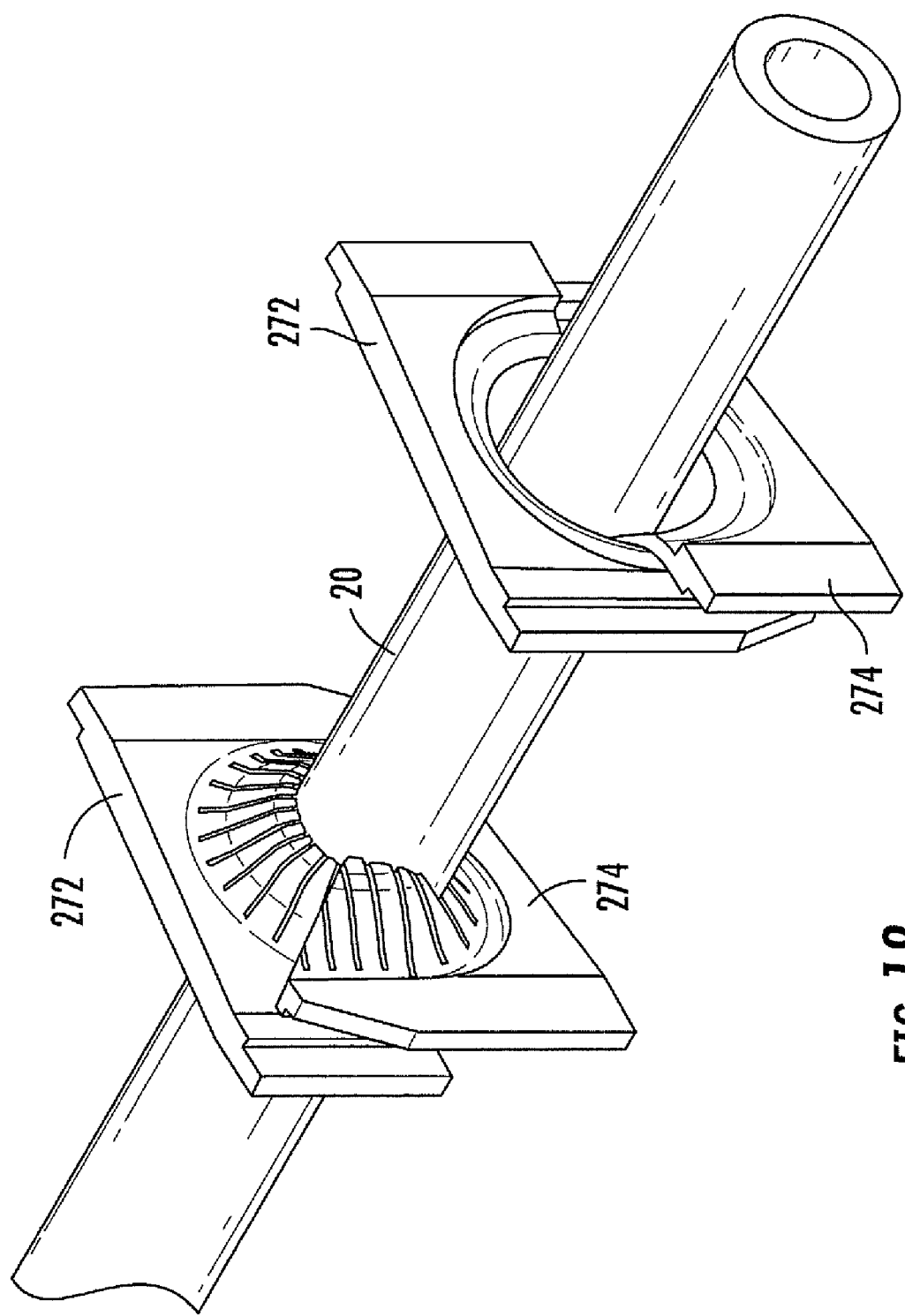
FIG. 18 is an enlarged, perspective view of the cable entry grommet system of FIG. 17 in a closed position.

With reference to FIGS. 17 and 18, the grommet system 270 includes two sets of top and bottom grommets 272, 274 axially spaced apart along the cable passthrough axis E-E. Each top grommet 272 is seated in a corresponding grommet mount structure 218 and each bottom grommet 274 is seated in a corresponding grommet mount structure 228. The top and bottom grommets 272, 274 of each set are generally vertically opposed as shown in FIG. 17.

Each top grommet 272 includes a plurality of resilient fingers or flaps 272A defining a semi-circular opening 272B. Each top grommet 272 also includes an extension arm 272C. Each bottom grommet 274 includes a plurality of resilient fingers 274A defining a semi-circular opening 274B. Each bottom grommet 274 also includes an extension arm 274C. The extension arms 272C, 274C are asymmetrically, inversely positioned.

In use, the cable 20 is laid into the bottom grommets 274 when being installed in the sealant masses 64. As the housing parts 210, 220 are closed, the associated top and bottom grommets 272, 274 of a set collectively surround the cable 20 and progressively matingly overlap one another as shown in FIG. 18. The flaps 272A, 274A deform to conform to the cable 20. The extension arms 272C, 274C begin to overlap before the housing parts 210, 220 are fully closed in order to ensure that the grommets are properly positioned about the cable 20 to retain the sealant 62, 64 once the sealant 62, 64 is loaded by the housing parts 210, 220 and/or the compression mechanism 240. According to some embodiments, the top and bottom grommets 272, 274 overlap prior to triggering of the compression mechanism 240 by the triggering mechanism 250 when the housing parts 210, 220 are closed.

The grommet system 270 can form dams about the cable 20 to prevent or inhibit the sealant 52, 54 from exuding out of the sealing region. The grommets 272, 274 may be configured and positioned so that the sealant 52, 54 is well-contained before the associated compression mechanism 240 is actuated. If not well-contained, the sealant 52, 54 may be forced out through openings when the spring force is applied. According to some embodiments, the grommets 272, 274 fully or effectively enclose or seal off any openings about the cable 20 to the sealant before the spring force is released. According to some embodiments, the grommets 272, 274 fully or effectively enclose or seal off any openings about the cable 20 before the housing parts 210, 220 are fully closed.

A single size of grommets 272, 274 may perform the foregoing effective sealing functions for an extended range of cable sizes.

According to some embodiments, and as illustrated, the flexible flaps 272A, 274A are positioned and angled or tapered inwardly (i.e., axially toward the sealant 54) to further mechanically resist exudation of the sealant 52, 54 when the sealant 52, 54 is loaded by the spring 244.

The grommets 272, 274 may be formed of any suitable material. According to some embodiments, the grommets 272, 274 are formed of a polymeric material. According to some embodiments, the grommets 272, 274 are formed of an elastomeric material. Suitable materials may include rubber, silicone rubber, injection molded rubbers, or low density polyethylene, for example.

The cable sealing system 230, and particularly the grommet system 270 may enable relatively high compression loading of the sealants 62, 64 while also limiting egress of the sealant sealants 62, 64 from the sealant cavities 226A, 242A or the assembly 200.

While cables 20 having optical fibers 28 as transmission media have been disclosed herein, according to further embodiments, cables having other types of transmission media (e.g., electrical conductors formed of copper or other metal) may be used. Cables without such transmission media or other elongate members may be used.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A sealing assembly for providing an environmental seal about an elongate member, the sealing assembly comprising:
   a housing defining a passage to receive an elongate member;
   a flowable sealant disposed in the passage;
   a compression mechanism including a biasing member, wherein the biasing member is configured to apply a compression load against the sealant and the compression mechanism is configured to force the sealant to flow about the elongate member to provide an environmental seal about the elongate member; and
   a trigger mechanism configured to selectively actuate the biasing member to apply the compression load to the sealant;
   wherein the trigger mechanism is operative to retain the compression mechanism in a cocked position, wherein the biasing member is preloaded, and to release the compression member into an actuated position, wherein the preloaded biasing member applies the compression load to the sealant.

2. The sealing assembly of claim 1 wherein:
   the housing includes first and second housing parts relatively movable between an open position and a closed position; and
   the trigger mechanism is configured to automatically release the compression mechanism into the actuated position from the cocked position responsive to closing of the housing.

3. The sealing assembly of claim 1 wherein the biasing member is configured to maintain the compression load against the sealant after the housing is closed to maintain a positively pressurized environmental seal about the elongate member.

4. The sealing assembly of claim 3 wherein the biasing member is configured to maintain the compression load against the sealant at a pressure of at least about 10 KPa.

5. The sealing assembly of claim 1 wherein the biasing member includes a spring.

6. The sealing assembly of claim 5 wherein the compression mechanism includes a pressure plate that is displaceable by the spring to apply the compression load against the sealant.

7. The sealing assembly of claim 5 wherein the spring is preloaded in tension when the compression mechanism is in the cocked position.

8. The sealing assembly of claim 5 wherein the spring is preloaded in compression when the compression mechanism is in the cocked position.

9. The sealing assembly of claim 1 wherein the elongate member has an elongate member lengthwise axis and the biasing member is configured to apply the compression load against the sealant in a loading direction transverse to the elongate member lengthwise axis.

10. The sealing assembly of claim 1 wherein the sealant includes a gel that is elastically displaced by the compression load.

11. The sealing assembly of claim 1 wherein the sealing assembly is a cable enclosure assembly and the housing includes first and second housing parts relatively movable between an open position and a closed position, the first and second housing parts defining an enclosed chamber when the housing is in its closed position.

12. The sealing assembly of claim 1 wherein:
    the housing includes first and second housing parts relatively movable between an open position and a closed position;
    the flowable sealant includes a first sealant disposed in the first housing part and a second sealant disposed in the second housing part;
    the first and second sealants are configured to collectively surround the elongate member in the passage when the housing is closed; and
    the biasing member is configured to load the first sealant against the second sealant to provide the environmental seal circumferentially about the elongate member.

13. The sealing assembly of claim 12 wherein:
    the housing includes at least one first containment wall defining a first containment cavity in the first housing part, and at least one second containment wall defining a second containment cavity in the second housing part;
    the first sealant is disposed in the first containment cavity;
    the second sealant is disposed in the second containment cavity; and
    the first and second sealants are bounded by the first and second containment walls to limit displacement of the first and second sealants when the first sealant is loaded against the second sealant by the biasing member.

14. The sealing assembly of claim 13 wherein:
    the elongate member has an elongate member lengthwise axis; and the first and second containment walls are configured to limit axial displacement of the sealant when the compression load is applied to the sealant by the biasing member.

15. The sealing assembly of claim 1 wherein the elongate member has an elongate member lengthwise axis, and the sealing assembly includes at least one grommet configured to circumferentially wrap about the elongate member to limit axial displacement of the sealant when the compression load is applied to the sealant by the biasing member.

16. The sealing assembly of claim 15 wherein:
the housing includes first and second housing parts relatively movable between an open position and a closed position; and
the sealing assembly includes first and second grommets mounted on the first and second housing parts, respectively, and configured to circumferentially wrap about the elongate member and overlap one another to limit axial displacement of the sealant when the compression load is applied to the sealant by the biasing member.

17. A method for forming an environmental seal about an elongate member using a sealing assembly including a housing defining a passage, a flowable sealant disposed in the passage, and a compression mechanism including a biasing member, the method comprising:
using a trigger mechanism, retaining the compression mechanism in a cocked position, wherein the biasing member is preloaded;
installing the elongate member in the passage; and thereafter
actuating the trigger mechanism to selectively actuate the biasing member of the compression mechanism, including, using the triggering mechanism, releasing the compression member from the cocked position into an actuated position, wherein the preloaded biasing member applies a compression load to the sealant to force the sealant to flow about the elongate member to provide an environmental seal about the elongate member using the compression mechanism.

18. The method of claim 17 wherein actuating the trigger mechanism includes relatively moving first and second housing parts of the housing from an open position to a closed position, responsive to which the trigger mechanism automatically releases the compression mechanism from the cocked position to the actuated position.

19. The method of claim 17 wherein actuating the trigger mechanism is followed by maintaining the compression load against the sealant using the biasing member to maintain a positively pressurized environmental seal about the elongate member.

20. The method of claim 19 wherein maintaining the compression load against the sealant comprises maintaining the compression load against the sealant at a pressure of at least about 10 KPa using the biasing member.

21. The method of claim 17 including applying the compression load against the sealant in a loading direction transverse to an elongate member lengthwise axis of the elongate member using the biasing member of the compression mechanism.

22. The method of claim 17 wherein the sealant includes an elastically deformable gel, and including elastically elongating and deforming the gel using the compression load such that the gel deforms to substantially conform to a portion of the elongate member and a restoring force in the elastically deformed gel bears against the portion of the elongate member.

23. A sealing assembly for providing an environmental seal about an elongate member having an elongate member lengthwise axis, the sealing assembly comprising:
a housing defining a passage to receive an elongate member, wherein the housing includes first and second housing parts relatively movable between an open position and a closed position;
a flowable sealant disposed in the passage;
a compression mechanism including a biasing member, wherein the biasing member is configured to apply a compression load against the sealant and the compression mechanism is configured to force the sealant to flow about the elongate member to provide an environmental seal about the elongate member; and
first and second grommets mounted on the first and second housing parts, respectively, and configured to circumferentially wrap about the elongate member and overlap one another to limit axial displacement of the sealant when the compression load is applied to the sealant by the biasing member.

24. The sealing assembly of claim 23 including a trigger mechanism configured to selectively actuate the biasing member to apply the compression load to the sealant.

* * * * *